US009290028B2

(12) United States Patent
Yorimoto et al.

(10) Patent No.: US 9,290,028 B2
(45) Date of Patent: Mar. 22, 2016

(54) IMAGE FORMING APPARATUS, PATTERN POSITION DETERMINING METHOD, AND IMAGE FORMING SYSTEM

(75) Inventors: Mamoru Yorimoto, Kanagawa (JP); Tatsuhiko Okada, Saitama (JP); Daisaku Horikawa, Saitama (JP); Makoto Moriwaki, Kanagawa (JP)

(73) Assignee: Ricoh Company, Ltd, Tokyo (JP)

( * ) Notice: Subject to any disclaimer, the term of this patent is extended or adjusted under 35 U.S.C. 154(b) by 38 days.

(21) Appl. No.: 13/397,133

(22) Filed: Feb. 15, 2012

(65) Prior Publication Data

US 2012/0218568 A1 Aug. 30, 2012

(30) Foreign Application Priority Data

Feb. 24, 2011 (JP) ................................ 2011-038742
Dec. 16, 2011 (JP) ................................ 2011-276399

(51) Int. Cl.
*G06K 15/10* (2006.01)
*B41J 29/38* (2006.01)

(52) U.S. Cl.
CPC ...................................... *B41J 29/38* (2013.01)

(58) Field of Classification Search
CPC ...... B41J 29/393; B41J 2202/17; B41J 29/38; B41J 2/04553; B41J 2/04563; B41J 2/0458; B41J 2/04591; B41J 2/17513; B41J 2/17556; B41J 2/2135
See application file for complete search history.

(56) References Cited

U.S. PATENT DOCUMENTS

| | | | | |
|---|---|---|---|---|
| 7,841,682 | B2 | 11/2010 | Yorimoto et al. | |
| 7,854,489 | B2 | 12/2010 | Hagiwara et al. | |
| 7,905,590 | B2 | 3/2011 | Yorimoto | |
| 7,914,096 | B2 | 3/2011 | Hagiwara et al. | |
| 7,992,953 | B2 | 8/2011 | Yorimoto et al. | |
| 8,042,904 | B2 | 10/2011 | Niihara et al. | |
| 2008/0225066 | A1 | 9/2008 | Yorimoto et al. | |
| 2008/0225067 | A1 * | 9/2008 | Morino et al. | 347/14 |
| 2008/0225068 | A1 | 9/2008 | Morino et al. | |
| 2008/0231649 | A1 | 9/2008 | Kawabata et al. | |
| 2009/0015621 | A1 | 1/2009 | Hirota et al. | |
| 2009/0189937 | A1 | 7/2009 | Naruse et al. | |

(Continued)

FOREIGN PATENT DOCUMENTS

| | | |
|---|---|---|
| JP | 58213205 | 12/1983 |
| JP | 63-195616 | 8/1988 |

(Continued)

OTHER PUBLICATIONS

Japanese Office Action issued Sep. 29, 2015 for Application No. JP 2011-276399.

*Primary Examiner* — Tammy Pham
*Assistant Examiner* — Idowu O Osifade
(74) *Attorney, Agent, or Firm* — Harness, Dickey & Pierce, P.L.C.

(57) ABSTRACT

An image forming apparatus which reads a test pattern formed by ejecting liquid droplets onto a recording medium to adjust an ejection timing of the liquid droplets is disclosed. The image forming apparatus includes an image forming unit; a reading unit; a relative movement unit; an intensity data obtaining unit which obtains intensity data on a reflected light which is received from a scanning position of a light by a light receiving unit while the light moves over the test pattern; and a position detection unit which applies a line position determining operation on the intensity data in the vicinity of a point of inflection included between an upper-limit threshold value and a lower-limit threshold value, and detects a position of a line.

8 Claims, 24 Drawing Sheets

(56) References Cited

U.S. PATENT DOCUMENTS

| | | | | |
|---|---|---|---|---|
| 2011/0050775 | A1* | 3/2011 | Komatsu et al. | 347/14 |
| 2011/0134187 | A1 | 6/2011 | Naruse et al. | |
| 2011/0134190 | A1 | 6/2011 | Mase et al. | |
| 2011/0205299 | A1 | 8/2011 | Naruse et al. | |

FOREIGN PATENT DOCUMENTS

| | | | |
|---|---|---|---|
| JP | 2001-129980 | A | 5/2001 |
| JP | 2005-148299 | A | 6/2005 |
| JP | 2008-229915 | A | 10/2008 |
| JP | 2008229921 | A | 10/2008 |

* cited by examiner

IMAGE FORMING APPARATUS, PATTERN POSITION DETERMINING METHOD, AND IMAGE FORMING SYSTEM

TECHNICAL FIELD

The present invention generally relates to liquid-ejecting image forming apparatuses and more specifically relates to an image forming apparatus which can correct an offset of an impacting position of liquid droplets.

BACKGROUND ART

Image forming apparatuses (below called liquid ejecting image forming apparatuses) are known which eject liquid droplets onto a sheet material such as a sheet of paper to form an image. The liquid ejecting image forming apparatuses may generally be divided into a serial-type image forming apparatus and a line-head type image forming apparatus. In the serial-type image forming apparatus, a recording head moves in both main scanning directions perpendicular to a direction of sheet conveying while the sheet conveying is repeated to form an image over the sheet of paper. In the line head-type image forming apparatus with nozzles being aligned in a length which is almost the same length as a maximum width of the sheet of paper, when a timing arrives at which the sheet of paper is conveyed and the liquid droplets are ejected, nozzles within the line head eject the liquid droplets to form the image.

However, it is known that, in the serial-type image forming apparatus, when one ruled line is printed in both directions of an outward path and a return path, an offset of the ruled line is likely to occur between the outward path and the return path. Moreover, it is known that, in the line head-type image forming apparatus, parallel lines are likely to appear in the sheet-conveying direction when there is a nozzle whose position of impacting is constantly offset due to a mounting error, finishing accuracy of the nozzle, etc.

Therefore, in the liquid-ejecting image forming apparatus, it is often the case that a test pattern for self-adjustment to adjust the position of impacting the liquid droplets is printed on the sheet material, the test pattern is optically read, and an ejection timing is adjusted based on the read results (see Patent document 1, for example.)

Patent document 1 discloses an image forming apparatus which includes a pattern forming unit that forms, on a water-repellent member, a reference pattern including multiple independent liquid droplets and a pattern to be measured that includes multiple independent liquid droplets ejected under an ejection condition different from the reference pattern such that they are aligned in a scanning direction of a recording head; a reading unit including a light emitting unit which irradiates a light onto the respective patterns and a light receiving unit which receives a regular reflected light from the respective patterns; and a correction unit which measures a distance between the respective patterns based on read results of the reading unit for correcting of a liquid droplet ejection timing of the recording head based on the measurement results.

PATENT DOCUMENTS

Patent Document 1 JP2008-229915A

FIG. 1 is a diagram illustrating an exemplary method of measuring the distance between the respective patterns that is disclosed in Patent document 1. In Patent document 1, a point at which a sensor output voltage So becomes less than or equal to a lower limit threshold Vrd is stored as a point P2, and then, searching from P2 in an arrow-indicated Q2 direction, a point at which the sensor output voltage So exceeds the upper limit threshold Vru is stored as a point P1. Then, a regression line L1 is calculated from the output voltage So between the point P1 and the point P2, and an intersecting point of the regression line L1 and a mean value Vc of the upper and lower thresholds is calculated using a regression line equation and is set as an intersecting point C1. The intersecting point C1 represents a position in the vicinity of an edge of a pattern, making it possible for the image forming apparatus to determine a distance between patterns.

However, the method of correcting the liquid droplet ejection timing as disclosed in Patent document 1 has a problem that a method of determining an upper-limit threshold and a lower-limit threshold is not disclosed. If the intersecting point C1 is determined using the upper- and lower-limit thresholds, a method of determining the intersecting point C1 becomes stable. However, it is not necessarily the case that the intersecting point C1 is an edge between a basis material of the water-repellant member and the pattern.

DISCLOSURE OF THE INVENTION

In light of the problems as described above, an object of embodiments of the present invention is to provide an image forming apparatus which adjusts an ejection timing of liquid droplets, which image forming apparatus can more accurately specify an edge position of a test pattern.

According to an embodiment of the present invention, an image forming apparatus which reads a test pattern formed by ejecting liquid droplets onto a recording medium to adjust an ejection timing of the liquid droplets, includes: an image forming unit which obtains pattern data of the test pattern to form the test pattern on the recording medium; a reading unit including a light emitting unit which irradiates a light onto the recording medium and a light receiving unit which receives a reflected light from the recording medium; a relative movement unit which moves the recording medium or the reading unit at a constant speed; an intensity data obtaining unit which obtains intensity data on the reflected light which is received from a scanning position of the light by the light receiving unit while the light moves over the test pattern; and a position detection unit which applies a line position determining operation on the intensity data in the vicinity of a point of inflection included between an upper-limit threshold value and a lower-limit threshold value, and detects a position of a line.

Embodiments of the present invention makes it possible to provide an image forming apparatus which adjusts an ejection timing of liquid droplets, which image forming apparatus can more accurately specify an edge position of a test pattern.

BRIEF DESCRIPTION OF THE DRAWINGS

Other objects, features, and advantages of the present invention will become more apparent from the following detailed descriptions when read in conjunction with the accompanying drawings, in which.

BEST MODE FOR CARRYING OUT THE INVENTION

A description is given below with regard to embodiments of the present invention with reference to the drawings.

Figure 1:
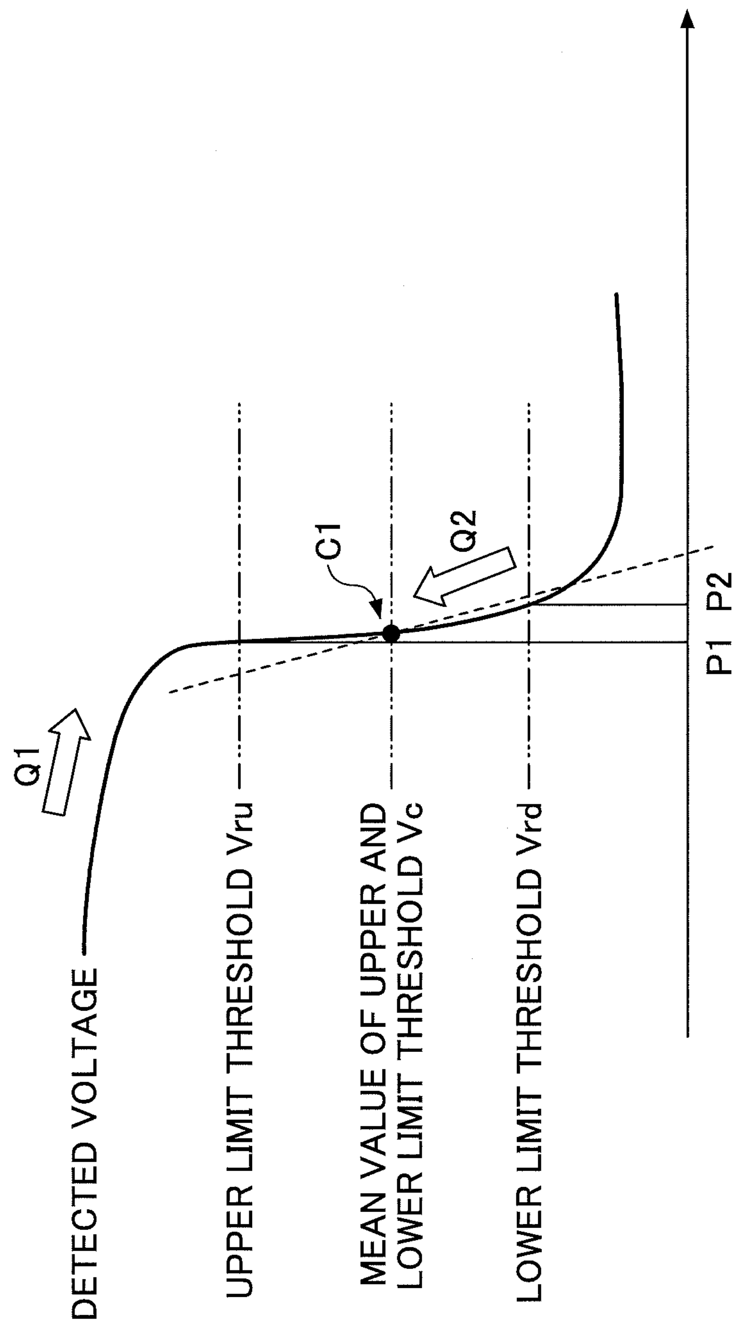
FIG. 1 is a diagram illustrating an exemplary related-art method of measuring a distance between respective patterns.
Figure 2A:
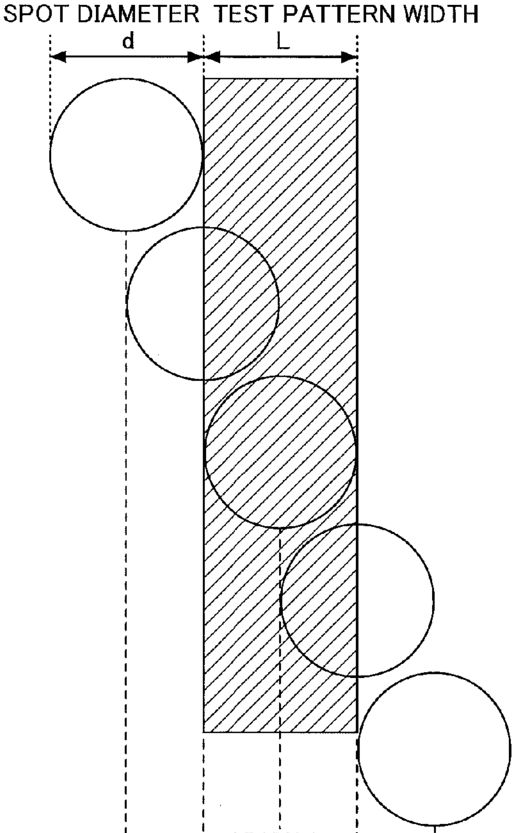
FIGS. 2A and 2B are exemplary diagrams which schematically describe specifying of an edge position according to an embodiment of the present invention.
Figure 2B:
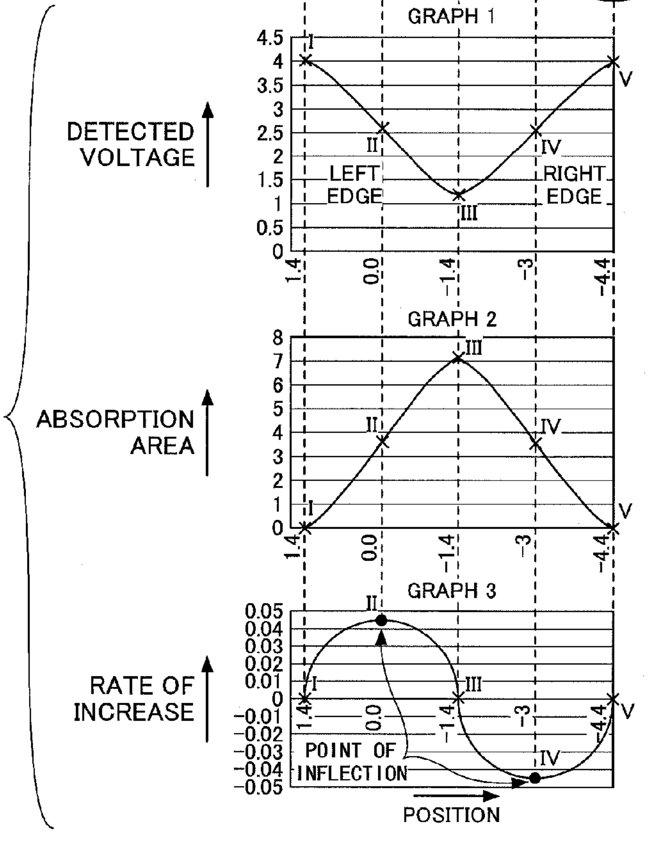

FIGS. 2A and 2B are exemplary diagrams which schematically describe specifying of an edge position according to an embodiment of the present invention. A spotlight moves such that it crosses multiple lines (one line shown) which make up a test pattern at a constant speed (at equal speeds) (Below, the test pattern, and the line which makes up the test pattern are not precisely distinguished.) As a sheet material such as a sheet of paper moves in a longer direction of the line through sheet feeding, the spotlight moves such that it crosses the line obliquely; however, even when the sheet material stops, a method of specifying the edge position is the same. With the sheet material and the spotlight of a common wavelength, it can be said that a reflected light of the spotlight decreases the larger an overlapping area of the test pattern becomes.

Letters I-V in FIG. 2A show a time lapse.

Time I: The spotlight and the test pattern do not overlap;

Time II: A half of the spotlight overlaps the test pattern. At this moment, a rate of decrease of the reflected light becomes the largest (an overlapping area positively changes most in a unit time);

Time III: The whole of the spotlight overlaps the test pattern. At this moment, an intensity of the reflected light becomes the smallest; and Time IV: A half of the spotlight overlaps the test pattern. At this moment, a rate of increase of the reflected light becomes the largest (the overlapping area negatively changes most in the unit time.)

A centroid of the spotlight matches the edge position of the line of the test pattern at the Times II and IV. Therefore, if the fact that the spotlight and the line have relationships of the Times II and IV may be detected from the reflected light, the edge position may be specified accurately.

Thus, attention is focused on a point of inflection of the detected voltage of the reflected light that is detected by the light receiving element. For example, in FIG. 2B, with respect to an absorption area (an overlapping area of the spotlight and the test pattern), an absolute value of a slope becomes the largest in the Times II and IV. Moreover, in FIG. 2B, with respect to a derivative value of the absorption area, a rate of increase of the reflected light changes from an increasing trend to a decreasing trend in the Time II, while the rate of increase changes from the decreasing trend to the increasing trend in the Time IV. In this way, a point at which a turning direction changes on a curved line on a plane (a point at which a sign of a curvature changes on the curved line) is the point of inflection. In light of the above, it is seen that the point of inflection matches the edge position of the test pattern. In the present embodiment, attention is focused on this point of inflection to also detect the edge position, making it possible to accurately correct an impacting position offset of liquid droplets.

(Configuration)

Figure 3:
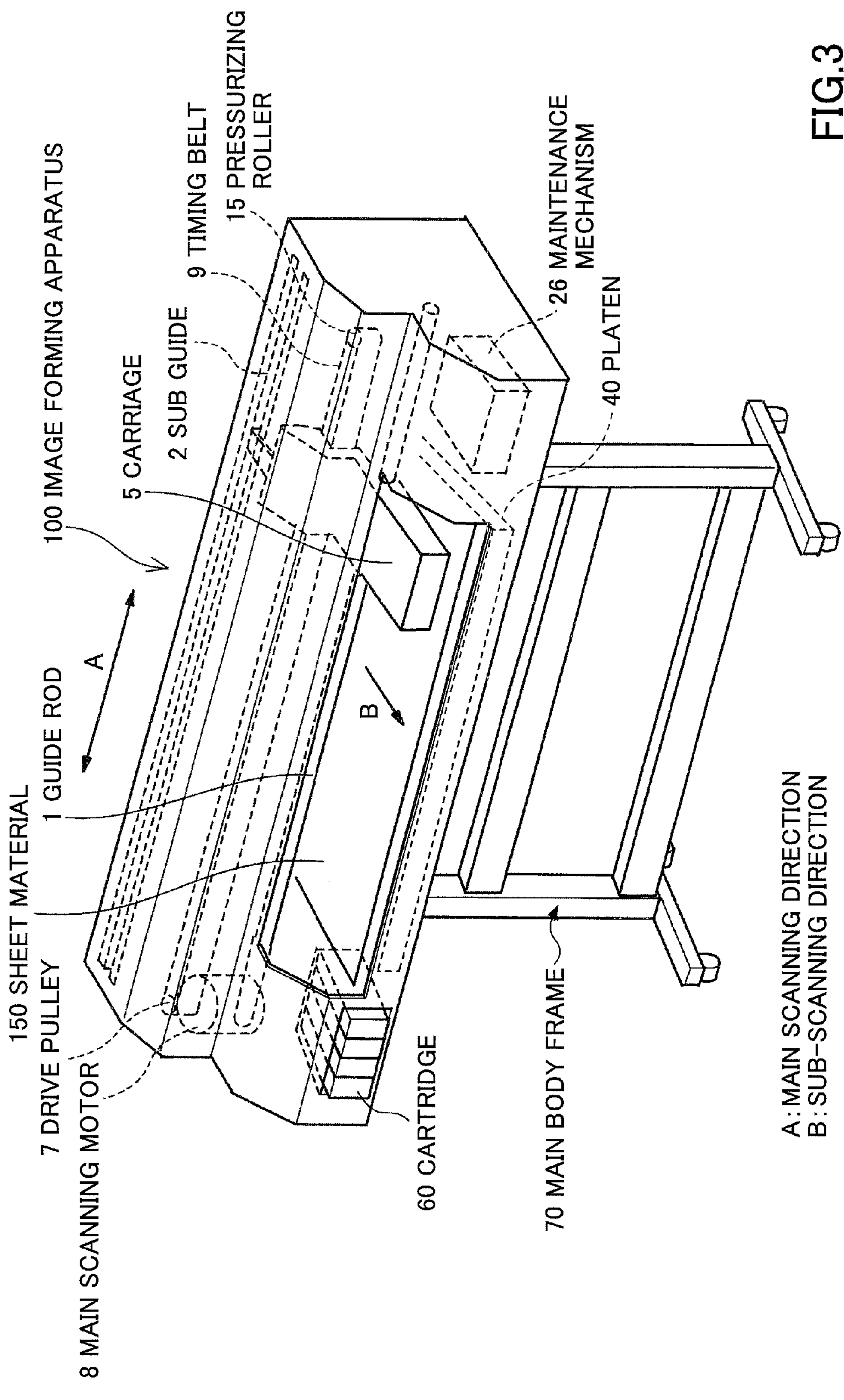
FIG. 3 is an exemplary schematic perspective view of a serial-type image forming apparatus.

FIG. 3 illustrates an exemplary schematic perspective view of a serial-type image forming apparatus 100. The image forming apparatus 100 is supported by a main body frame 70. A guide rod 1 and a sub guide 2 are bridged across in a longitudinal direction of the image forming apparatus 100, and a carriage 5 is held in arrow A directions (main scanning directions) by the guide rod 1 and the sub guide 2 such that it can move in both directions.

Moreover, an endless belt-shaped timing belt 9 is stretched by a drive pulley 7 and a pressurizing roller 15 in the main scanning directions, and a part of the timing belt 9 is fixed to the carriage 5. Moreover, the drive pulley 7 is rotationally driven by a main scanning motor 8, thereby moving the timing belt 9 in the main scanning directions and also moving the carriage 5 in both directions. With the tension being applied to the timing belt 9 by the pressurizing roller 15, the timing belt 9 may drive the carriage 5 without slack.

Moreover, the image forming apparatus 100 includes a cartridge 60 which supplies ink and a maintenance mechanism 26 which maintains and cleans a recording head.

A sheet material 150 is intermittently conveyed on a platen 40 on the lower side of the carriage 5 in an arrow B direction (a sub-scanning direction) by a roller (not shown). The sheet material 150 may be a recording medium onto which liquid droplets can be attached, such as an electronic substrate, a film, a glossy paper, a plain paper such as a sheet of paper, etc. For each conveying position of the sheet material 150, the carriage 5 moves in the main scanning directions and the recording head mounted on the carriage 5 ejects the liquid droplets. When the ejecting is finished, the sheet material 150 is again conveyed and the carriage 5 moves in the main scanning directions to eject the liquid droplets. The above process is repeated to form an image on the whole face of the sheet material 150.

Figure 4:
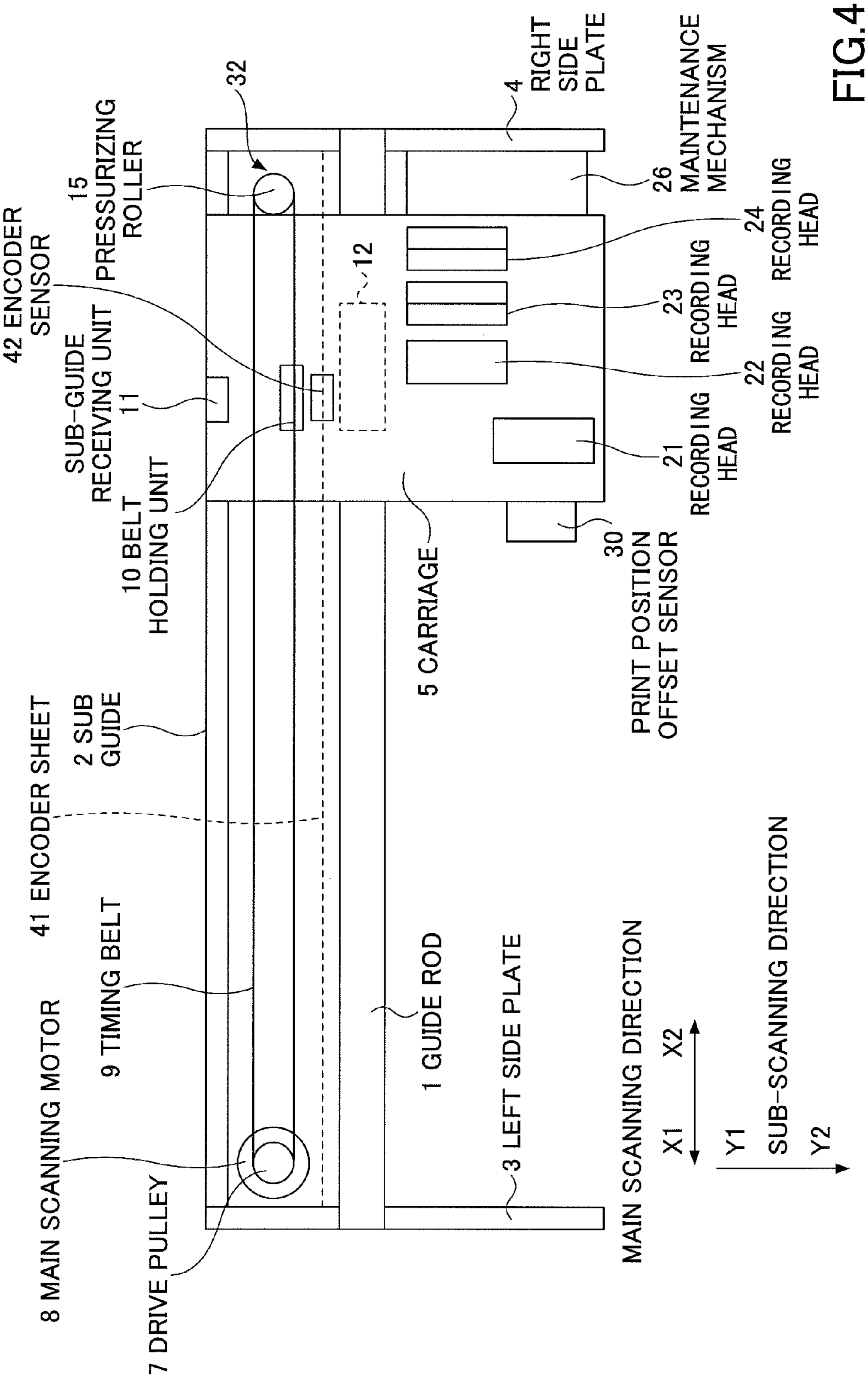
FIG. 4 is an exemplary diagram which describes in more detail an operation of a carriage.

FIG. 4 is an exemplary diagram which describes in more detail operations of the carriage 5. The above-described guide rod 1 and the sub rod 2 are bridged across a left side plate 3 and a right side plate 4, and the carriage 5 is held by bearings 12 and a sub-guide receiving unit 11 to be able to freely slide on the guide rod 1 and the sub-guide 2, so that it can move in arrows X1 and X2 directions (main scanning directions).

On the carriage 5 are mounted recording heads 21 and 22 which eject black (K) liquid droplets, and recording heads 23 and 24 which eject ink droplets of cyan (C), magenta (M), and yellow (Y). The recording head 21 is arranged since the black is often used alone, so that it may be omitted.

As the recording heads 21-24, a so-called piezo-type recording head in which piezoelectric elements are used as pressure generating units (an actuator unit) each of which pressurizes ink within an ink flow path (a pressure generating chamber) by deforming a vibrating plate which forms a wall face of the ink flow path to change a volume within the ink flow path to cause an ink droplet to be ejected; a so-called thermal-type recording head in which ink droplets are ejected with pressure due to using a heat generating resistive body to heat ink within each of the ink channel paths to generate foam; or an electrostatic-type recording head in which sets of a vibrating plate and an electrode, which form a wall face of the ink flow path, are arranged so that they oppose each other, and the vibrating plate is deformed due to an electrostatic force generated between the vibrating plate and the electrode, etc., to change a volume within the ink flow path to cause an ink droplet to be ejected.

A main scanning mechanism 32 which moves the carriage 5 to scan includes the main scanning motor 8 which is arranged on one side in the main scanning directions, the drive pulley 7 which is rotationally driven by the main scanning motor 8, the pressurizing roller 15 which is arranged on the other side in the main scanning directions, and the timing belt 9 which is bridged across the drive pulley 7 and the pressurizing roller 15. The pressurizing roller 15 has a tension force acting outward (in a direction away from the drive pulley 7) caused by a tension spring (not shown).

The timing belt 9 has a portion fixed to and held by a belt holding unit 10 which is provided on a back face side of the carriage 5, so that it pulls the carriage 5 in the main scanning directions with an endless movement of the timing belt 9.

Moreover, with an encoder sheet 41 arranged such that it follows the main scanning directions of the carriage 5, an encoder sensor 42 the carriage is provided with may read slits of the encoder sheet 42 to detect a position of the carriage 5 in the main scanning directions. When the carriage 5 exists in a recording area out of a main scanning area, the sheet material 150 is intermittently conveyed in an arrow-indicated Y1 to Y2 direction (a sub-scanning direction) which is orthogonal to the main scanning directions of the carriage 5 by a paper-conveying mechanism (not shown).

The above-described image forming apparatus 100 according to the present embodiment may drive the recording heads 21-24 according to image information to eject liquid droplets while moving the carriage 5 in the main scanning directions and intermittently conveying the sheet material 150 to form a required image on the sheet material 150.

On one side face of the carriage 5 is mounted a print position offset sensor 30 for detecting an offset of an impacting position (reading the test pattern). The print position offset sensor 30 reads a test pattern for detecting the impacting position that is formed on the sheet material 150 with a light receiving element which includes a reflective-type photosensor and a light-emitting element such as an LED, etc.

As the print position offset sensor 30 is for the recording head 21, a liquid droplet ejection timing of the recording heads 22-24 is adjusted, so it is preferable to mount a separate print position offset sensor 30 parallel to the recording heads 22-24. Moreover, the carriage 5 may have mounted a mechanism which slides the print position offset sensor 30 such that it becomes in parallel with the recording heads 22-24 to adjust a liquid droplet ejection timing of the recording heads 22-24 with one print position offset sensor 30. Alternatively, the liquid droplet ejection timing of the recording heads 22-24 may be adjusted with the one print position offset sensor 30 even when the image forming apparatus 100 conveys the sheet material 150 in a reverse direction.

Figure 5:
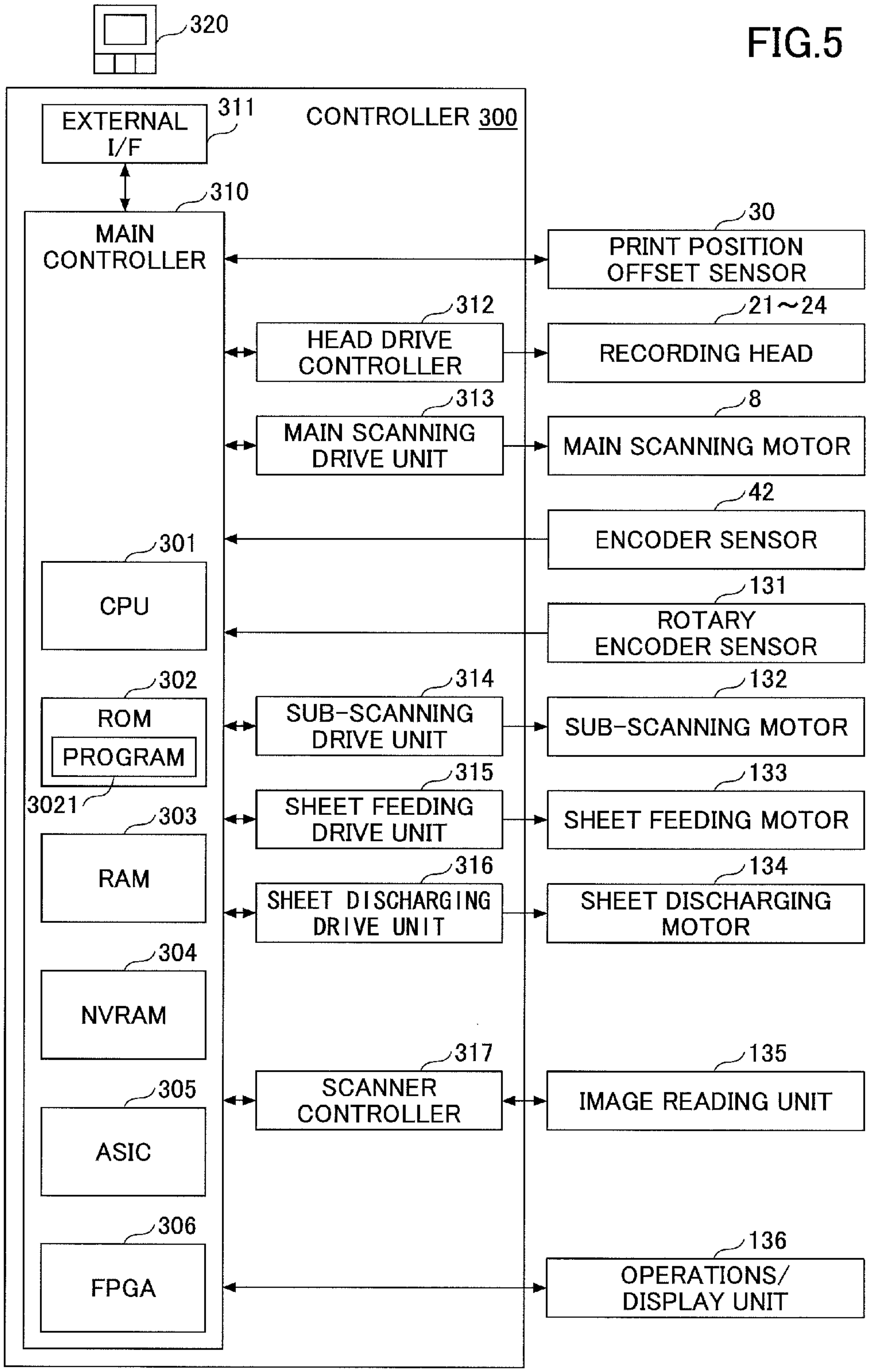
FIG. 5 is an exemplary block diagram of a controller of an image forming apparatus.

FIG. 5 is an exemplary block diagram of a controller 300 of the image forming apparatus 100. The controller 300 includes a main controller 310 and an external I/F 311. The main controller 310 includes a CPU 301, a ROM 302, a RAM 303, a NVRAM 304, an ASIC 305, and a FPGA (Field programmable gate array) 306. The CPU 301 executes a program 3021 which is stored in the ROM 302 to control the whole image forming apparatus 100. In the ROM 302 is stored, besides the program 3021, fixed data such as a parameter for control, an initial value, etc. The RAM 303 is a working memory which temporarily stores a program, image data, etc., while the NVRAM 304 is a non-volatile memory for storing data such as a setting condition, etc., even during a time a power supply of the apparatus is being blocked. The ASIC 305 performs various signal processing, sorting, etc., on the image data and controls various engines. The FPGA 306 processes input and output signals for controlling the whole apparatus.

The main controller 310 manages control with respect to forming a test pattern, detecting the test pattern, adjusting (correcting) an impacting position, etc., as well as control of the whole apparatus. As described below, in the present embodiment, while mainly the CPU 301 executes the program 3021 stored in the ROM 302 to detect an edge position, some or all processing may be performed by an LSI, such as the FPGA 306, the ASIC 305, etc.

The external I/F 311, which is a bus or a bridge for connecting to an IEEE 1394 port, a USB, and a communications apparatus for communicating with other equipment units connected to a network, externally outputs data generated by the main controller 310. To the external I/F 311 can be connected a detachable storage medium 320, and the program 3021 may be stored in the recording medium 320 or distributed via an external communications apparatus.

Moreover, the controller 300 includes a head drive controller 312, a main scanning drive unit 313, a sub-scanning drive unit 314, a sheet feeding drive unit 315, a sheet discharging drive unit 316, and a scanner controller 317. The head drive controller 312 controls for each of the recording heads 21-24 whether an ejection is made, and a liquid droplet ejection timing and an ejection amount in case the ejection is made. The head drive controller 312, which includes an ASIC (a head driver) for generating, aligning, and converting head data for driving and controlling the recording heads 21-24, generates, based on printing data (dot data to which a dithering process, etc., is applied), a drive signal which indicates the presence/absence of the liquid droplets and sizes of the liquid droplets to supply the generated drive signal to the recording heads 21-24. With the recording heads 21-24 including a switch for each nozzle and being turned on and off based on the drive signal, the recording heads 21-23 eject liquid droplets of specified sizes to impact at positions of the sheet material 150 specified by the printing data. The head driver of the head drive controller 312 may be provided on the recording heads 21-24 side or the head drive controller 312 and the recording heads 21-24 may be integrated. The configuration shown is an example.

The main scanning drive unit (a motor driver) 313 drives the main scanning motor 8 which moves the carriage 5 to scan. To the main controller 310 is connected an encoder sensor 42 which detects the above-described carriage position, and the main controller 310 detects a position in the main scanning directions of the carriage 5 based on this output signal. Then, the main scanning motor 8 is driven and controlled via the main scanning drive unit 313 to move the carriage 5 in both of the main scanning directions.

The sub-scanning drive unit (motor driver) 314 drives a sub-scanning motor 132 for conveying a sheet of paper. To the main controller 310 is input an output signal (a pulse) from a rotary encoder sensor 131 which detects an amount of movement in the sub-scanning direction, and the main controller 310, based on this output signal, detects an amount of sheet conveying, and drives and controls the sub-scanning motor 132 via the sub-scanning drive unit 314 to convey the sheet material via a conveying roller (not shown).

The sheet feeding drive unit 315 drives a sheet feeding motor 133 which feeds the sheet material from a sheet feeding tray. The sheet discharging drive unit 316 drives a sheet discharging motor 134 which drives a roller for discharging a printed sheet material 150 onto the platen 40. The sheet discharging drive unit 316 may be replaced with the sub-scanning drive unit 314.

The scanner controller 317 controls an image reading unit 135. The image reading unit 135 optically reads a manuscript and generates image data.

Moreover, to the main controller 310 is connected an operations/display unit 136 which includes various displays and various keys such as ten keys, a print start key, etc. The main controller 310 accepts a key input which is operated by a user via the operations/display unit 136, displays a menu, etc.

In addition, although not shown, it may also include a recovery drive unit for driving a maintenance and recovery motor which drives a maintenance mechanism 26, a solenoid drive unit (driver) which drives various solenoids (SOLS), and a clutch drive unit which drives electromagnetic cracks, etc. Moreover, a detected signal of various other sensors (not shown) is also input to the main controller 310, but illustrations thereof are omitted.

The main controller 310 performs a process of forming the test pattern on the sheet material and performs light emission drive control on the formed test pattern, which causes a light emitting element of the print position offset sensor 30 mounted on the carriage 5 to emit a light. Then, an output signal of the light receiving element is obtained, the reflected light of the test pattern is electrically read, an impacting position offset amount is detected from the read results, and, furthermore, a control process is performed in which a liquid droplet ejection timing of recording heads 21-24 is corrected based on the impacting position offset amount such that there would be no impacting position offset.

(Correction of Impacting Position Offset)

Figure 6:
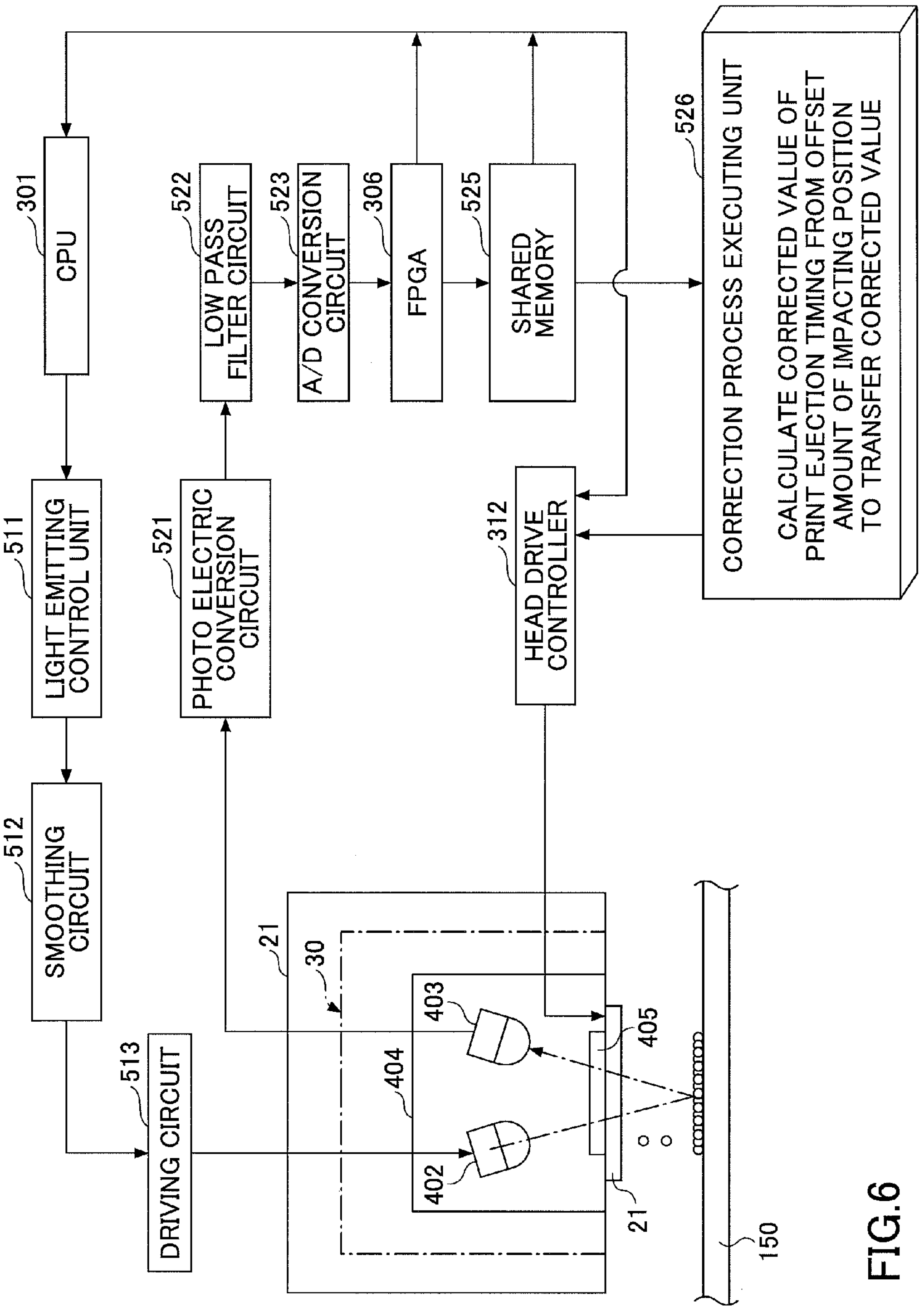
FIG. 6 is an exemplary diagram which schematically shows a configuration for a print position offset sensor to detect an edge of the test pattern.

FIG. 6 is an exemplary diagram which schematically shows a configuration for the print position offset sensor 30 to detect an edge position of a test pattern. FIG. 6 shows the recording head 21 and the print position offset sensor 30 in FIG. 4 that are viewed from the right side face plate 4.

The print position offset sensor 30 includes a light emitting element 402 and a light receiving element 403 which are aligned in a direction orthogonal to the main scanning directions. Arrangements of the light emitting element 402 and the light receiving element 403 may be reversed. The light emitting element 402 projects a below-described spotlight onto a test pattern, so that the light receiving element 403 receives a light reflected to the sheet material 150, a reflected light from the platen 40, other scattered lights, etc. The light emitting element 402 and the light receiving element 403 are fixed to inside a housing and a face which opposes the platen 40 of the print position offset sensor 30 is shielded from outside with a lens 405. In this way, the print position offset sensor 30 is packaged, so that it may be distributed as a unit.

Within the print position offset sensor 30, the light emitting element 402 and the light receiving element 403 are arranged in a direction which is orthogonal to a scanning direction of the carriage 5 (are arranged in a direction parallel to the sub-scanning direction). This makes it possible to reduce an impact, on detected results, of a moving speed change of the carriage 5.

For the light emitting element 402, an LED may be adopted, for example; however, the light emitting element 402 may be a light source (e.g., a laser, various lamps) which can project a visible light. The visible light is used in order to expect that the spotlight be absorbed by the test pattern. While a wavelength of the light emitting element 402 is fixed, multiple print position offset sensors 30 can also be mounted with the light emitting elements 402 of different wavelengths.

Moreover, a diameter of a spot formed by the light emitting element 402 is in the order of mms for using an inexpensive lens without using a high accuracy lens. For this spot diameter, which is related to accuracy of detecting an edge of a test pattern, even when it is in the order of mms, an edge position may be detected with sufficiently high accuracy as long as the edge position is determined according to the present embodiment. The spot diameter can also be made smaller.

When a certain timing is reached, the CPU 301 starts an impacting position offset correction. The above-mentioned timing includes, for example, a timing at which performing an impacting position offset correction is instructed from the operations/display unit 136 by the user; a timing at which the material is determined by the CPU 301 to be made of a certain sheet material 150 for which intensity of a light, reflected at the time the light emitting element 402 emits a light before ink is ejected, is no more than a predetermined value; a timing at which one of temperature and humidity, which are stored when an impacting position offset correction is performed, is offset by at least a threshold value, a periodic (daily, weekly, monthly, etc.) timing, etc.

Next, forming of the test pattern is described.

The CPU 301 instructs the main scanning controller 313 to move the carriage 5 in both directions and instructs the head drive controller 312 to eject liquid droplets with a predetermined test pattern as printing data. While the main scanning controller 313 moves the carriage 5 in both of the main scanning directions relative to the sheet material 150, the head drive controller 312 causes liquid droplets to be ejected from the recording head 21 to form a test pattern which includes at least two independent lines.

Moreover, the CPU 301 performs control for reading, by the print position offset sensor 30, the test pattern formed on the sheet material 150. More specifically, a PWM value for driving the light emitting element 402 of the print position offset sensor 30 is set in a light-emitting controller 511 by the CPU 301, and an output of the light-emitting controller 511 is smoothed at a smoothing circuit 512, so that the smoothed result is provided to a driving circuit 513. The driving circuit 513 drives the light emitting element 402 to emit a light, so that a spotlight is irradiated from the light emitting element 402 onto a test pattern of the sheet material 150. The light emitting controller 511, the smoothing circuit 512, the driving circuit 513, a photoelectric conversion circuit 521, a low-pass filter 522, an A/D conversion circuit 523, and a correction process executing unit 526 are installed in the main controller 310. The shared memory 525 is the RAM 303, for example.

A spotlight from the light emitting element 402 is irradiated onto a test pattern on a sheet material, so that a reflected light which is reflected from the test pattern is incident on the light receiving element 403. The light receiving element 403 outputs an intensity signal of the reflected light to the photoelectric conversion circuit 521. More specifically, the photoelectric conversion circuit 521 photoelectrically converts the intensity signal so as to output the photoelectrically converted signal to the low-pass filter circuit 522. The low-pass filter circuit 522 removes a high-frequency noise portion and then outputs the photoelectrically converted signal to the A/D conversion circuit 523. The A/D conversion circuit 523 A/D converts the photoelectrically converted signal and outputs the A/D converted signal to the signal processing circuit (FPGA) 306. The signal processing circuit (FPGA) 306 stores the detected voltage data sets (the detected voltage and the detected voltage data set are used with no particular distinction) which are digital values of the A/D converted detected voltage into the shared memory 525.

The correction process executing unit 526 reads the detected voltage data sets stored in the shared memory 525, performs an impacting position offset correction, and sets the correction in the head drive controller 312. In other words, the correction process executing unit 526 detects an edge position of a test pattern to compare with an optimal distance between two lines to calculate an impacting position offset amount.

The correction process executing unit 526 calculates a correction value of a liquid droplet ejection timing at which the recording head 21 is driven such that the impacting position offset is removed to set the calculated correction value of the liquid droplet ejection timing in the head drive controller 312. In this way, when driving the recording head 21, the head drive controller 312 corrects the liquid droplet ejection timing based on the correction value to drive the recording head 21, making it possible to reduce the impacting position offset of the liquid droplets.

Figure 7:
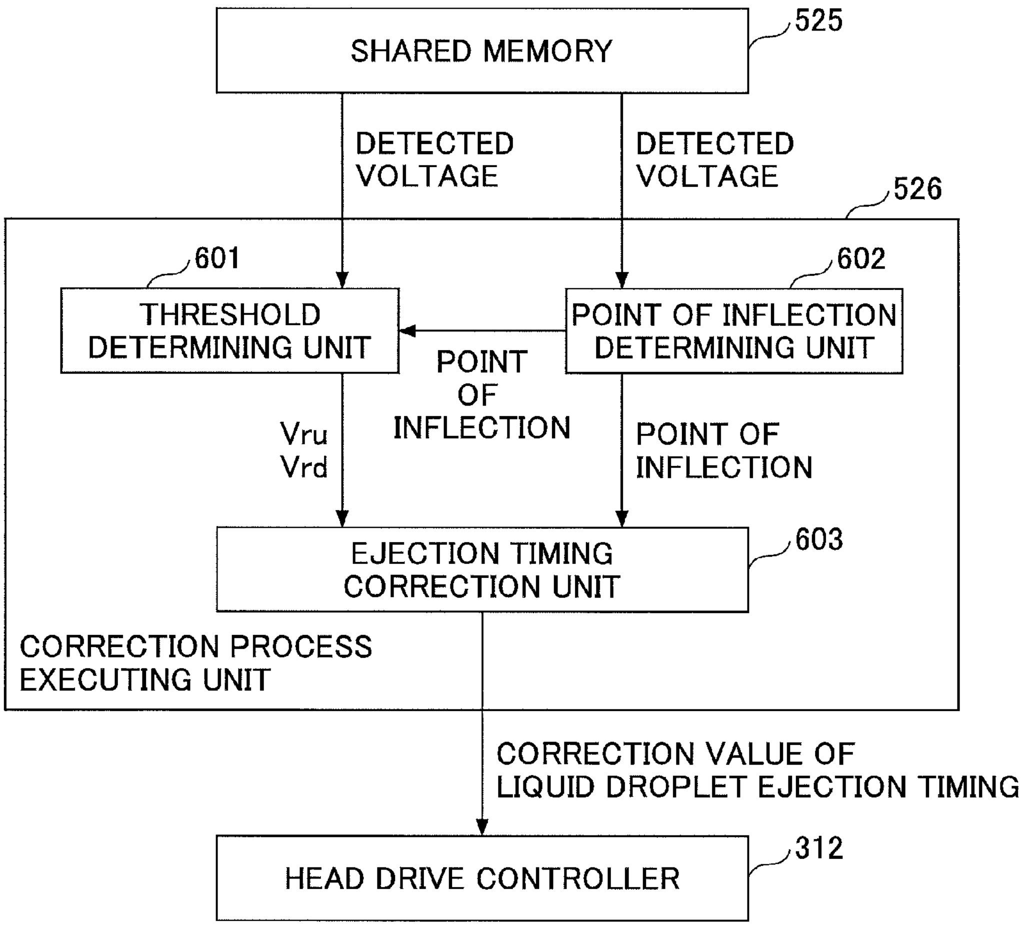
FIG. 7 is an exemplary functional block diagram of a correction process executing unit.

FIG. 7 is an exemplary functional block diagram of the correction process executing unit 526. The correction process executing unit 526 includes a threshold value determining unit 601, a point of inflection determining unit 602, and an ejection timing correction unit 603. The threshold value determining unit 601 determines an upper-limit threshold value Vru and a lower-limit threshold value Vrd for calculating an edge position of a test pattern. The ejection timing correction unit 603 corrects the liquid droplet ejection timing based on an impacting position offset amount which is determined from the edge position of the test pattern. These processes will be described below in detail.

(Spotlight Position and Edge Position)

Next, a relationship between a spotlight and an edge position is described using FIGS. 8, 9A, 9B, 9C, and 9D.

Figure 8:
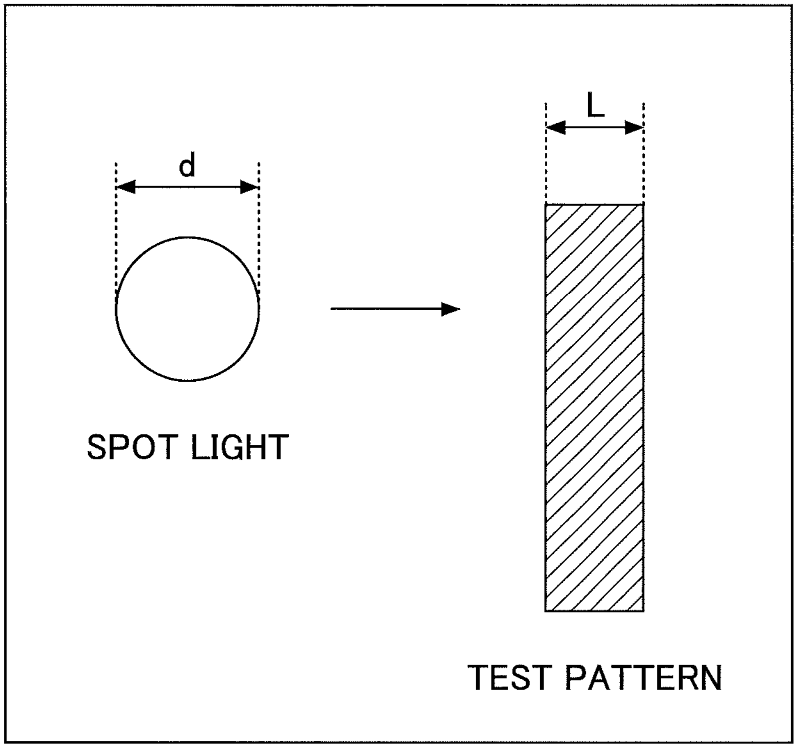
FIG. 8 is a diagram illustrating an example of a spotlight and the test pattern.

FIG. 8 is a diagram illustrating an example of a spotlight and a test pattern. The spotlight moves such that it crosses multiple lines (one line shown) which make up the test pattern at a constant speed (equal speeds); however, the speed of the crossing may be arranged to be variable in the image forming apparatus according to embodiments of the present invention. As a sheet material such as a sheet of paper moves in a longer direction of the line through sheet feeding, the spotlight moves such that it crosses the line obliquely; however, even when the sheet material stops, a method of specifying the edge position is the same. With the sheet material and the spotlight of a common wavelength, it can be said that a reflected light of the spotlight decreases the larger an overlapping area of the test pattern becomes.

In FIGS. 8, 9A, 9B, 9C, and 9D, it is assumed that Spot diameter d=Line width L of a test pattern; however, a relationship between the Spot diameter d and the Line width L is described below.

Figure 9A:
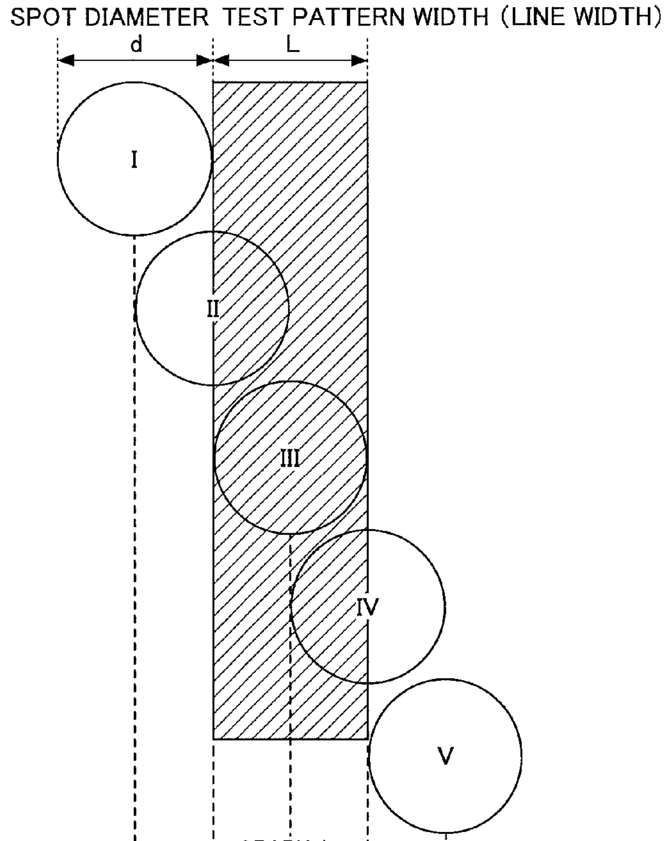
FIGS. 9A, 9B, 9C, and 9D are diagrams illustrating an example of the spotlight and the test pattern.
Figure 9B:
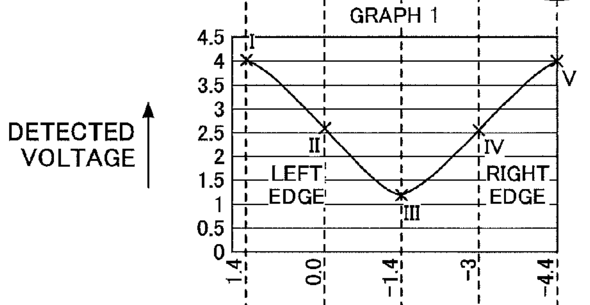
Figure 9C:
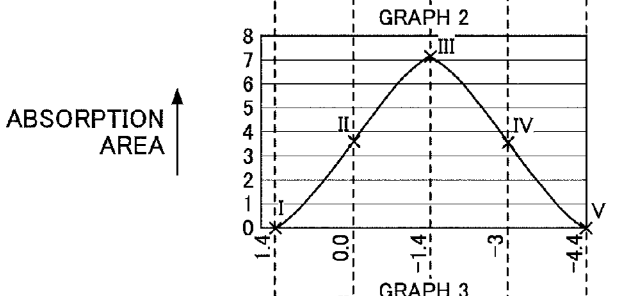
Figure 9D:
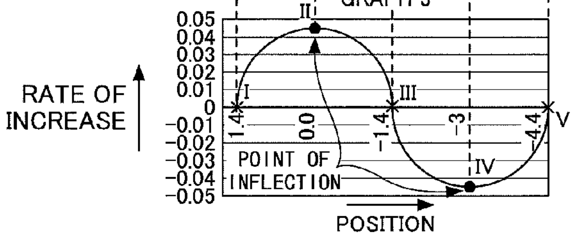

Letters I-V in FIG. 9A show a time lapse, where an elapsed time is longer for the lower spotlight in FIG. 9A. FIG. 9B shows an example of detected voltage of a light receiving element, FIG. 9C shows an example of an absorption area (an overlapping area of a test pattern and a spotlight), and FIG. 9D is an example of a rate of increase of the absorption area that is a derivative of the absorption area in FIG. 9C. The same information is obtained for FIG. 9D even if a derivative of an output waveform in FIG. 9B is taken. Moreover, while the absorption area is calculated from a detected voltage, for example, it does not have to be an absolute value, so that, for the absorption area in FIG. 9C, the detected voltage in FIG. 9B is subtracted from a predetermined value to obtain the same waveform as the absorbent area.

As described above, a rate of decrease of the reflected light becomes the largest in the Time II (an overlapping area positively changes most in a unit time.) A rate of increase of the reflected light becomes the largest in the Time IV (the overlapping area negatively changes most in the unit time.) Then, as shown in FIG. 9D, a point at which the rate of increase changes from an increasing trend to a decreasing trend matches the Time II, while a point at which the rate of increase changes from a decreasing trend to an increasing trend matches the Time IV.

The point at which the rate of increase changes from the increasing trend to the decreasing trend or vice versa is a point at which a turning direction changes in a curve on a plane, or a point of inflection. In light of the above, when an output signal demonstrates the point of inflection, it means that the spotlight matches the edge position of the test pattern. Therefore, when the point of inflection is accurately detected, the position of the edge may also be accurately specified.

(Specification of Edge Position)

Figure 10A:
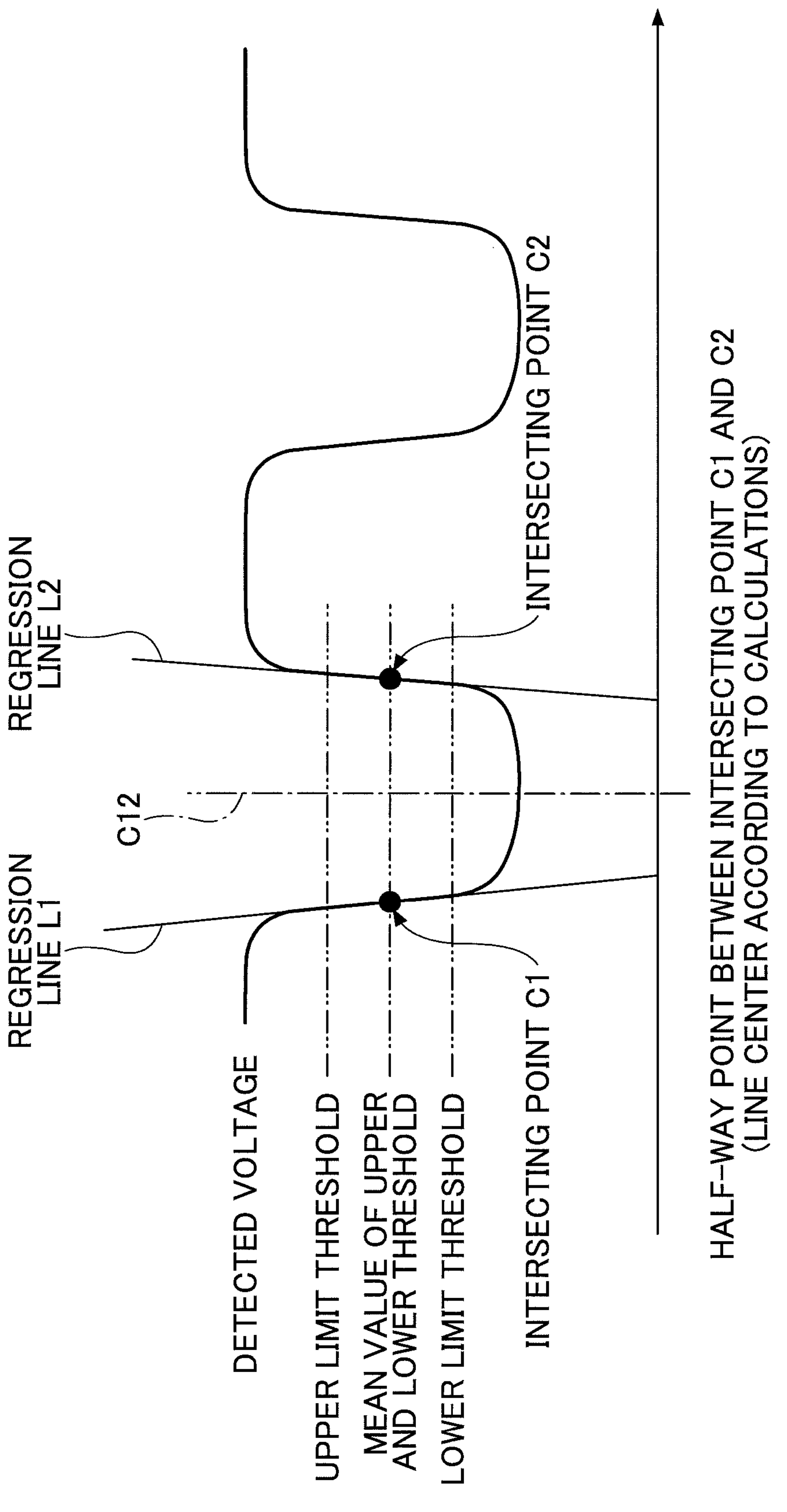
FIGS. 10A and 10B are exemplary diagrams which describe a method of specifying an edge position.
Figure 10B:
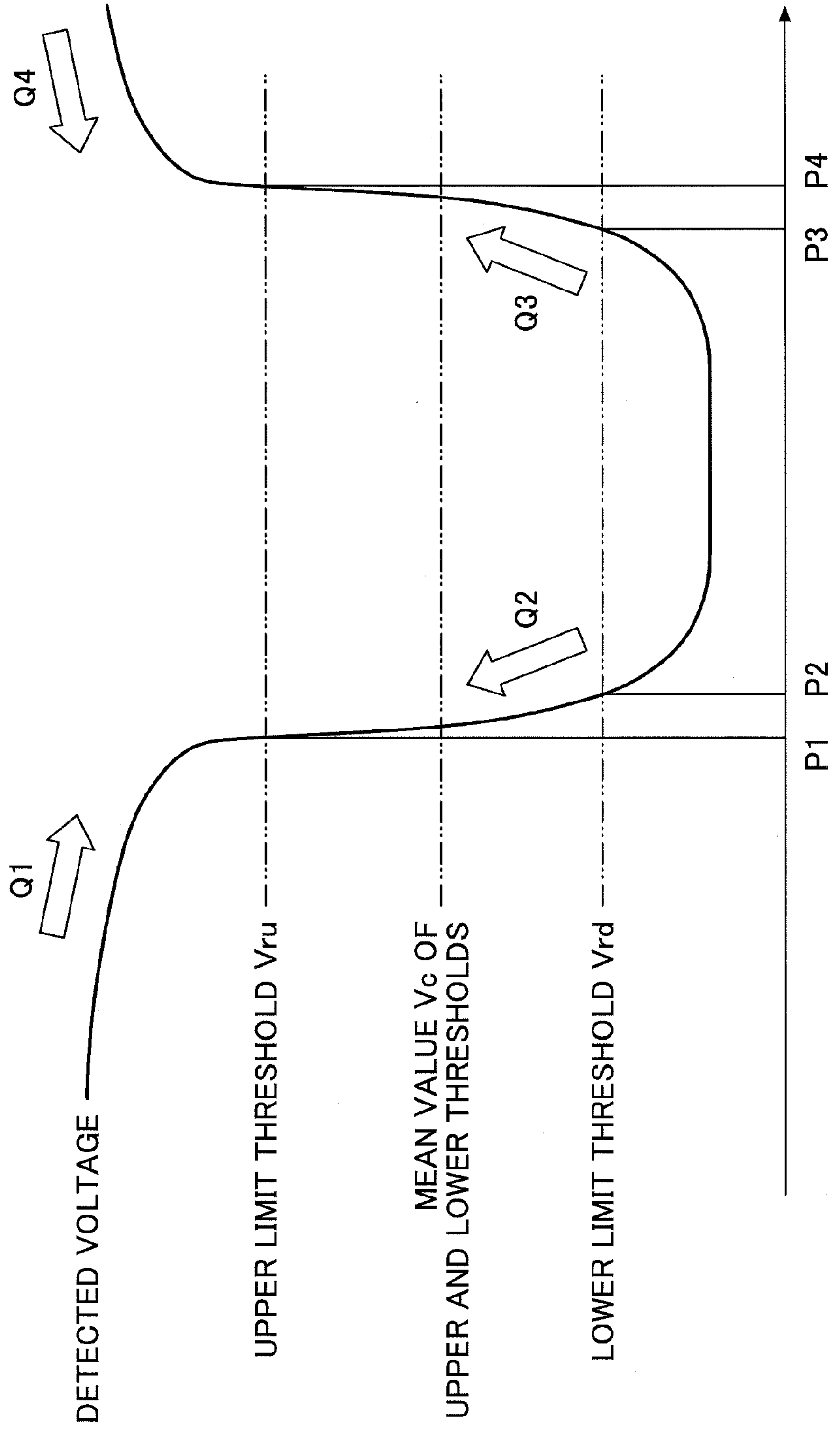

FIGS. 10A and 10B are exemplary diagrams which describe a method of specifying an edge position. FIG. 10A shows a schematic diagram of a detected voltage, while FIG. 10B shows an expanded view of the detected voltage. In the present embodiment, an upper-limit threshold value Vru and a lower-limit threshold value Vrd are determined such that a point of inflection of the detected voltage is included between the upper-limit threshold value Vru and the lower-limit threshold value Vrd of the detected voltage. As described below, the CPU 301 calibrates an output of the light emitting element 402 and a sensitivity of the light receiving element 403 such that the detected voltage takes an almost constant value (a below-described 4 V) for a region onto which ink is not ejected). The detected voltage becomes no more than a constant voltage Vo at the time of calibration.

An approximate value of a point of inflection may be experimentally determined by the ejection timing correction process executing unit 526 or a developer. As described above, it is a position at which a slope is closest to zero when a derivative of the detected voltage or the absorption area is taken, for example. The threshold value determining unit 601 determines two points which are equidistant to the calculated point of inflection or experimentally determined point of inflection as the upper limit threshold value Vru and the lower limit threshold value Vrd. It is determined such that the upper-limit threshold value Vru does not exceed a constant value Vo. In this way, a sufficient margin may be provided to make it possible to make sure that a point of inflection is always included between the lower-limit threshold value Vrd and the upper-limit threshold value Vru.

The ejection timing correction unit 603 searches a falling portion of the detected voltage in an arrow-indicated Q1 direction to store a point at which the detected voltage is no more than the lower limit threshold value Vrd as a point P2. Next, it searches the same in an arrow-indicated direction Q2 from the point P2 to store a point at which the detected voltage exceeds the upper limit threshold value Vru as a point P1.

Then, using multiple detected voltage data sets between the point P1 and the point P2, a regression line L1 is calculated and an intersecting point of the regression line L1 and a mean value Vc of the upper and lower threshold values is calculated and is set as an intersecting point C1.

Similarly, the ejection timing correction unit 603 searches a rising portion of the detected voltage in an arrow-indicated Q3 direction to store a point at which the detected voltage is no less than the lower limit threshold Vru as a point P4. Next, it searches the same in an arrow-indicated direction Q4 from the point P4 to store a point at which the detected voltage is no more than the upper limit threshold value Vrd as a point P3.

Then, using multiple detected voltage data sets between the point P3 and the point P4, a regression line L2 is calculated and an intersecting point of the regression line L2 and a mean value Vc of the upper and lower thresholds is calculated and is set as an intersecting point C2. The ejection timing correction unit 603 specifies the intersecting points C1 and C2 as an edge position of two lines. According to a determining process of the upper and lower thresholds, the intersecting points C1 and C2 may be arranged to approximately match the point of inflection.

Thereafter, the ejection timing correction unit 603 calculates a difference between an ideal distance between the two lines of the test pattern and a distance between the intersecting points C1 and C2. This difference is an impacting position offset amount of a position of an actual line relative to a position of an ideal line. Based on the calculated impacting position offset amount, the ejection timing correction unit 603 calculates a correction value for correcting a timing for causing liquid droplets to be ejected from the recording head 21 (a liquid droplet ejection timing) and sets the correction value to the head drive controller 312. In this way, the head drive controller 312 drives the recording head 21 with the corrected liquid droplet ejection timing, so that the impacting position offset is reduced.

(Determining Point of Inflection)

The point of inflection determining unit 602 may directly determine a point of inflection without determining the lower-limit threshold value Vrd and the upper-limit threshold value Vru. It is seen that a waveform of the detected voltage becomes point symmetrical around the point of inflection due to the nature of the point of inflection, which is used to determine the point of inflection.

Figure 11A:
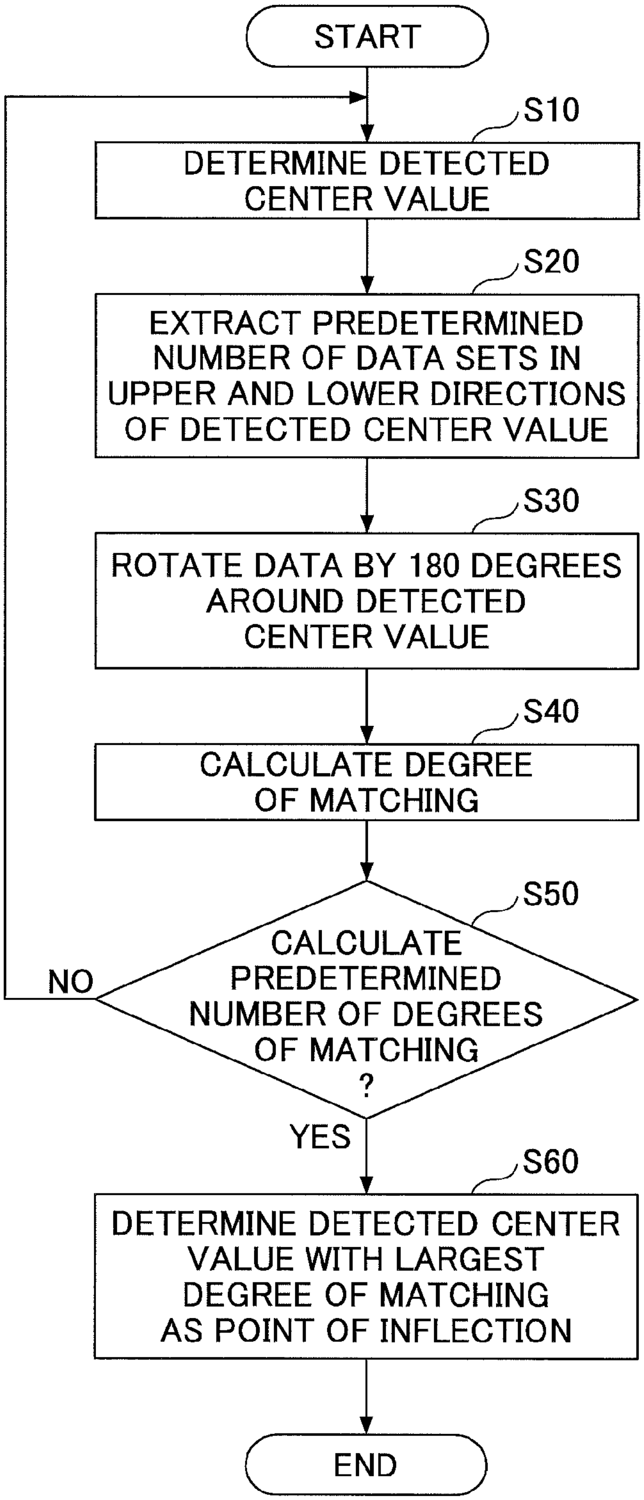
FIGS. 11A and 11B are exemplary flowcharts which show a procedure for detecting a point of inflection.
Figure 11B:
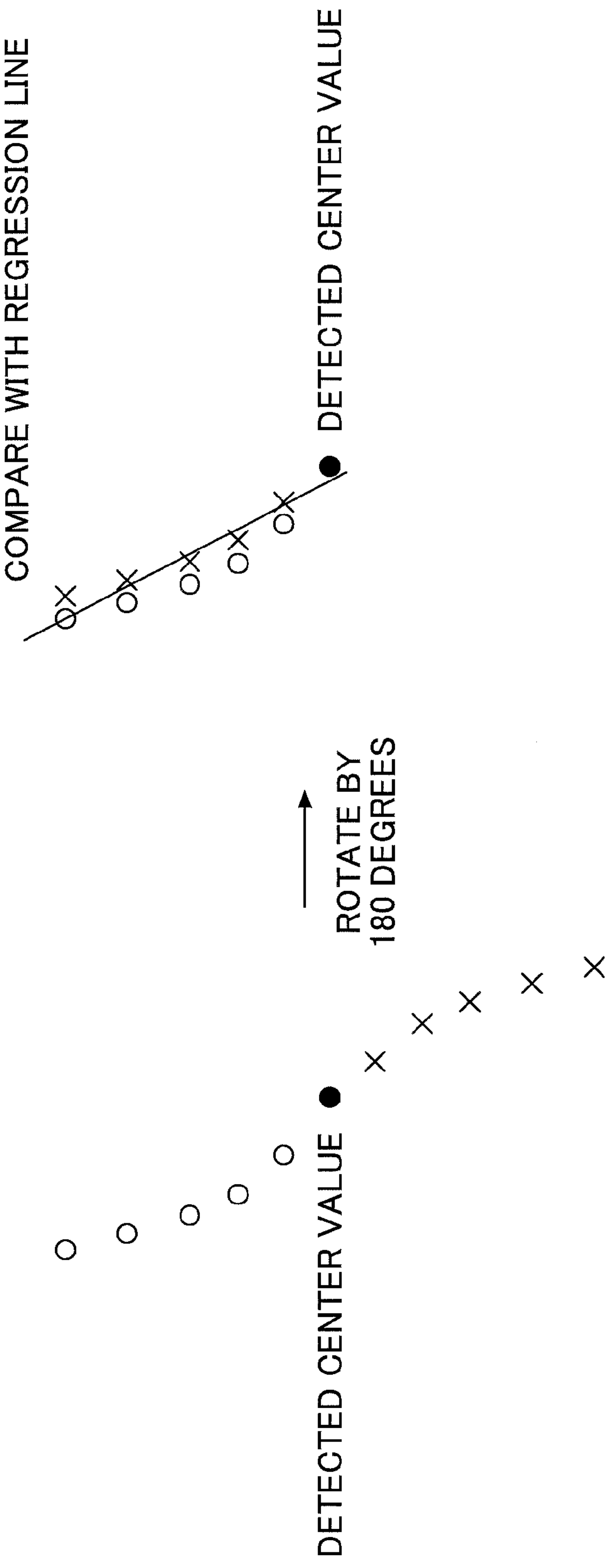

FIG. 11A is an example of a flowchart illustrating a procedure for detecting the point of inflection, while FIG. 11B is an exemplary diagram which schematically describes a detection of the point of inflection.

The point of inflection determining unit 602 focuses on an appropriate initial value (preferably around a point of inflection) of the detected voltage and sets it as a center detected value (S10).

Next, the point of deflection determining unit 602 extracts a predetermined number of data sets in upward and downward directions of the detected voltage relative to a detected center value (S20).

The point of inflection determining unit 602 rotates data on the upper side or data on the lower side by 180 degrees around the detected center value (S30).

The point of inflection determining unit 602 calculates a degree of matching of data in each group on the upper and lower sides (S40). The degree of matching includes an index for a case in which a regression line (or a regression curve) is for two of the predetermined number of data sets, etc. The point of inflection determining unit 602 collates the detected center value with the degree of matching for storing in the RAM 303, etc.

The point of inflection determining unit 602 determines whether a predetermined number of degrees of matching have been calculated (S50). If yes (Yes in S50), it may be said that a point of inflection is included therein, so that the point of inflection determining unit 602 determines a detected center value with a largest degree of matching as a point of inflection (S60).

If no (No in S50), the point of inflection determining unit 602 determines the following detected center value, and repeats the process from step S20. The detected center value may be determined such that it is increased or decreased in constant intervals to cover the vicinity of the point of inflection, or a point of inflection may be determined with a high resolution by decreasing an increased amount or a decreased amount when the degree of matching turns to an increasing trend.

Such a method of determining makes it possible to determine a point of inflection in a relatively stable manner compared to a case with multiple points at which the detected voltage or the absorption area varies, so that a value of the derivative of the detected voltage or the absorption area becomes zero.

Figure 12A:
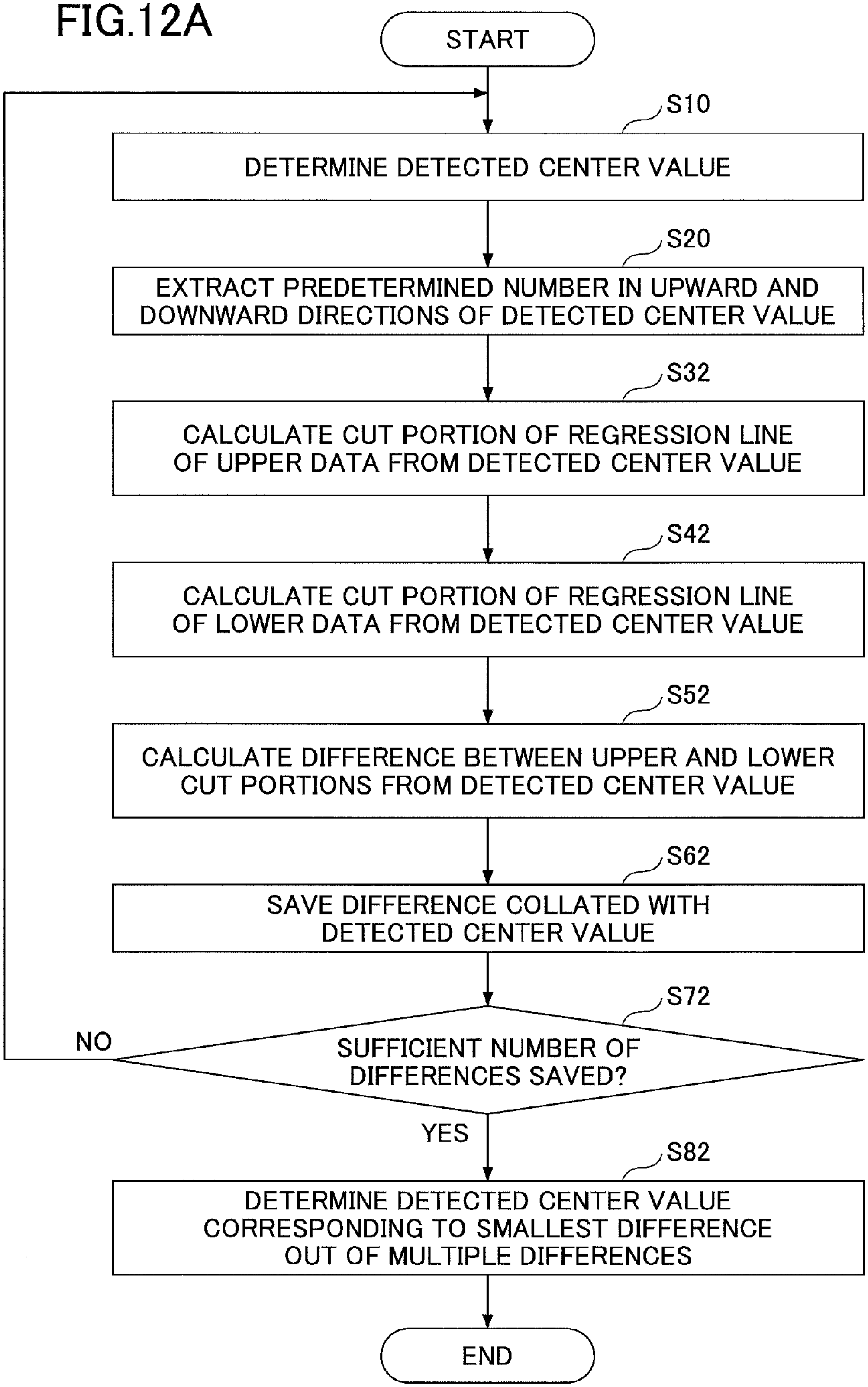
FIGS. 12A and 12B are exemplary flowcharts which show a procedure for detecting a point of inflection.
Figure 12B:
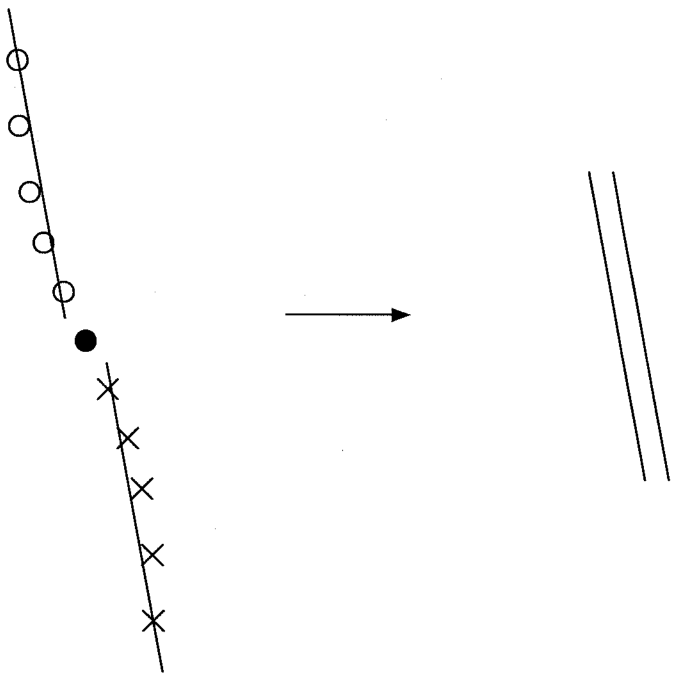

It is not necessary to make the 180 degree rotation, so that the point of inflection may be determined even in the following manner. FIG. 12A is an exemplary flowchart which illustrates a procedure for detecting the point of inflection, while FIG. 12B is an exemplary flowchart which schematically describes detecting of the point of inflection. The process up to step S20 is the same as FIG. 11.

The point of inflection determining unit 602 calculates a segment of a regression line of upper-side data from the detected center value (S32). The point of inflection determining unit 602 calculates a segment of a regression line of lower-side data from the detected center value (S42).

The point of inflection determining unit 602 calculates a difference of the two segments (S52). The point of inflection determining unit 602 collates the difference and the detected center value to store the collated results in the RAM 303, etc. (S62).

The point of inflection determining unit 602 determines whether a sufficient number of differences have been calculated (S72). If yes (Yes in S72), a detected center value corresponding to a smallest one of the stored multiple differences is determined as a point of inflection (S82). Such a method of determining makes it possible to determine a reliable point of inflection with an easy arithmetic operation.

When the point of inflection determining unit 602 determines the point of inflection, the ejection timing correcting unit 603 may calculate a correction value which corrects a timing at which a liquid droplet is caused to be ejected from the recording head 21 (a liquid droplet ejection timing) with the point of inflection as an edge position.

(Diameter of Spotlight and Line Width of Test Pattern)

While it is arranged that Spot diameter d=Line width L of a test pattern in FIG. 9, an edge position can be detected even with "Spot diameter d>Line width L of the test pattern" or "Spot diameter d<Line width L of the test pattern".

Figure 13A:
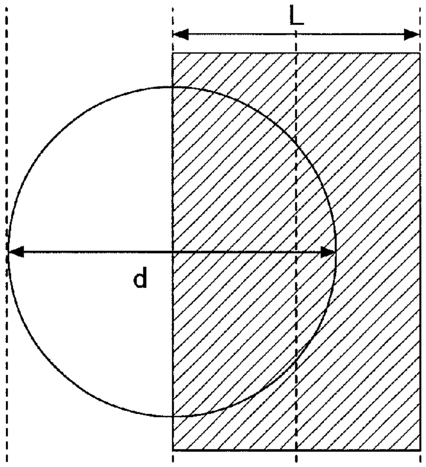
FIGS. 13A, 13B, 13C, and 13D are exemplary diagrams which describe a diameter of the spotlight and a line width of the test pattern.
Figure 13B:
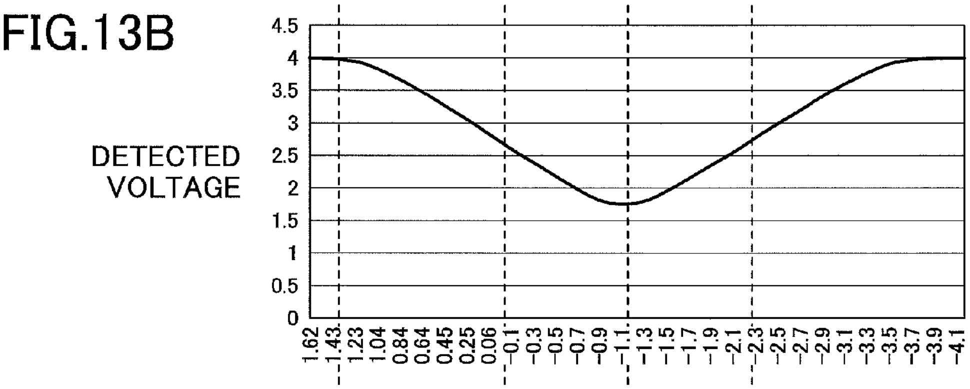
Figure 13C:
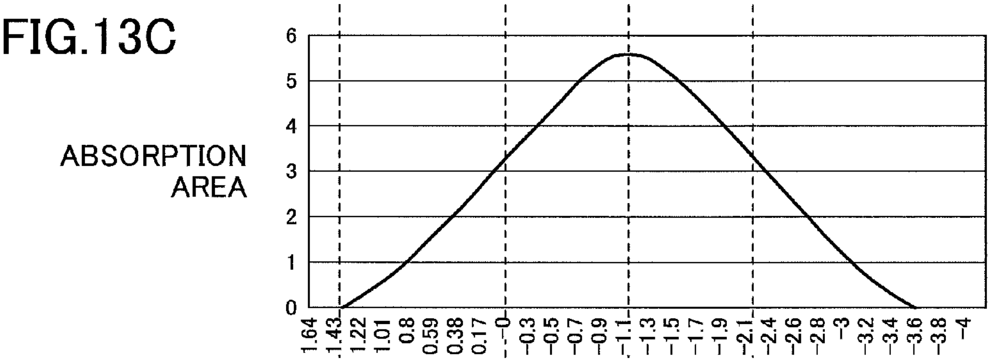

FIG. 13A shows an example of a test pattern and a spotlight which have a relationship that Spotlight diameter d>Line width L of a test pattern. Here, it is assumed that "d/2<L<d". FIG. 13B shows an example of a detected voltage of a light receiving element, FIG. 13C shows an example of an absorption area, and FIG. 13D shows a rate of increase of the absorption area, which is a derivative of the absorption area of FIG. 13C.

Figure 13D:
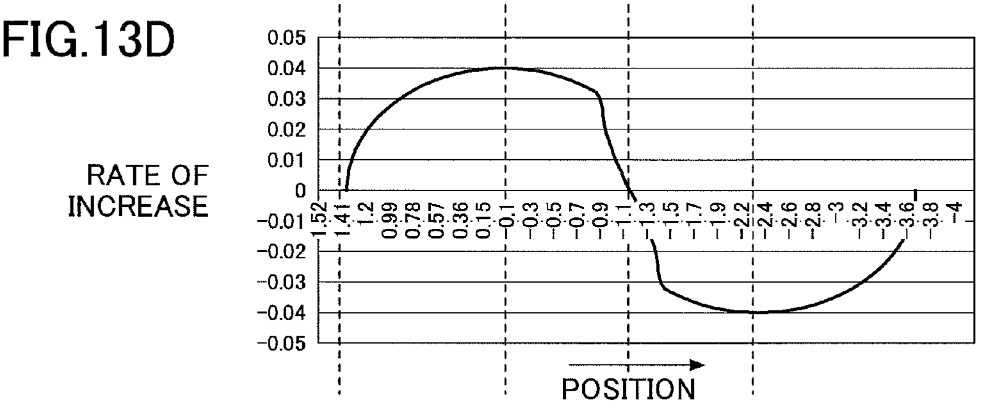

As Spot diameter d>Line width L of test pattern means that the spotlight and the test pattern do not overlap completely, the absorption area turns to a decreasing trend when a right edge of the spotlight gets over the test pattern and the rate of increase rapidly decreases as seen from the rate of increase of the absorption area in FIG. 13D.

However, in the present embodiment, as the intersecting points C1 and C2 may be obtained when detected voltage data in the neighborhood of the point of inflection is obtained, it suffices that the spotlight d is such that d/2<L. In other words, it suffices that the spot diameter d is not extremely large relative to the line width L of the test pattern.

Figures 14A, 14B, 14C, 14D:
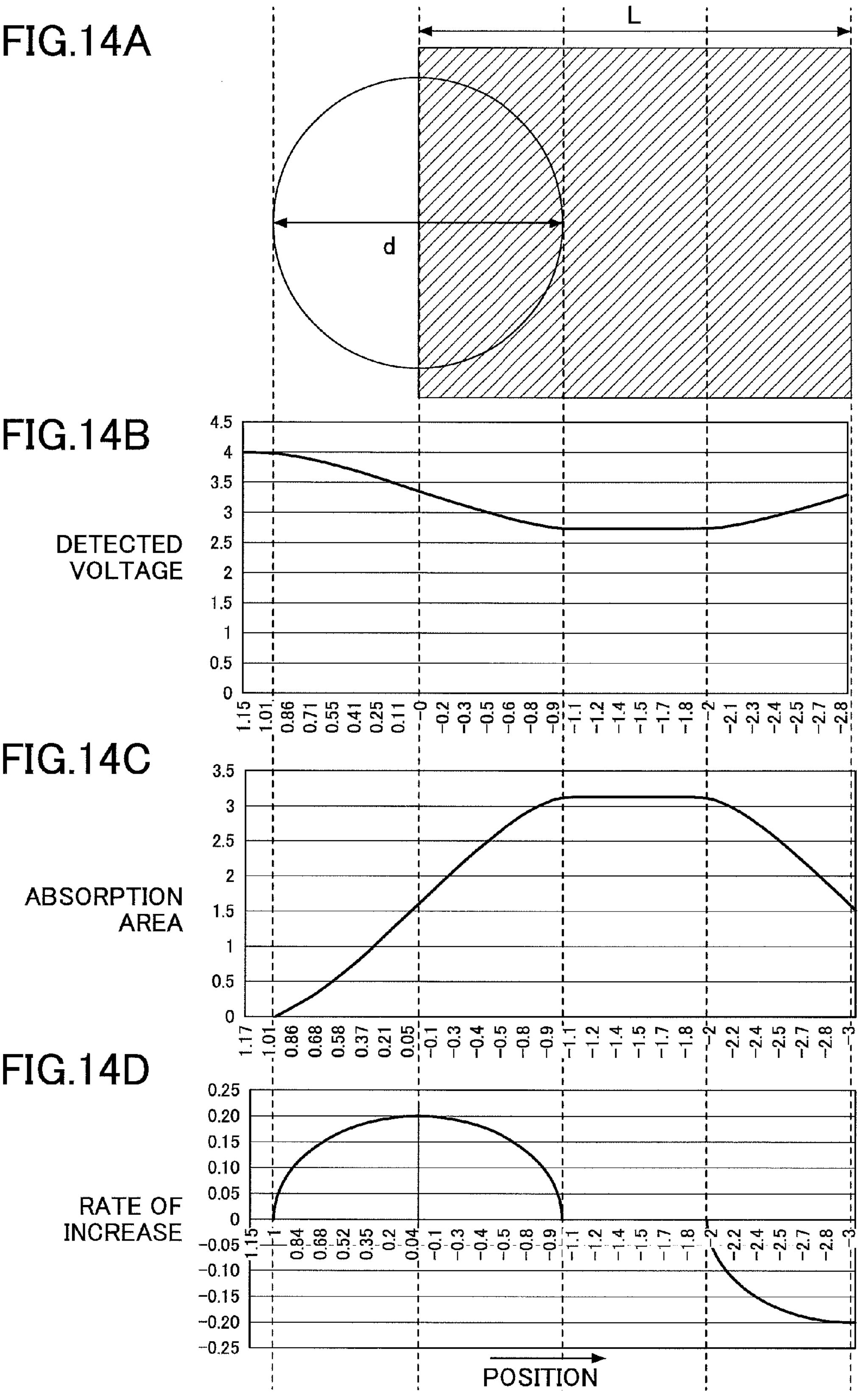
FIGS. 14A, 14B, 14C, and 14D are exemplary diagrams which describe the diameter of the spotlight and the line width of the test pattern.

FIG. 14A shows an example of a test pattern and a spotlight which have a relationship that Spotlight diameter d<<Line width L of a test pattern. FIG. 14B shows an example of a detected voltage of a light receiving element, FIG. 14C shows an example of an absorption area, and FIG. 14D shows a rate of increase of the absorption area, which is a derivative of the absorption area of FIG. 14C.

As Spot diameter d<Line width L of test pattern means that the spotlight and the test pattern continue to overlap completely, there occurs an area in which the detected voltage or the absorption area is constant as shown in FIGS. 14B and 14C. Moreover, as shown in FIG. 14D, there occurs an area in which the rate of increase of the absorption area is zero. Thereafter, the absorption area turns to a decreasing trend when a right edge of the spotlight gets over the test pattern, and the rate of increase slowly decreases (the rate of decrease increases).

In such a case, as in FIG. 9, detected voltage data sets in the neighborhood of the point of inflection are obtained sufficiently, making it possible for the ejection timing correction unit 603 to sufficiently determine the intersecting points C1 and C2.

(Case of Line-Type Image Forming Apparatus)

While the serial-type image forming apparatus 100 in FIGS. 3 and 4 is described as an example in the present embodiment, an impacting position offset amount may also be corrected with the same method in a line-type image forming apparatus 100. The line-type image forming apparatus 100 is briefly described.

Figure 15:
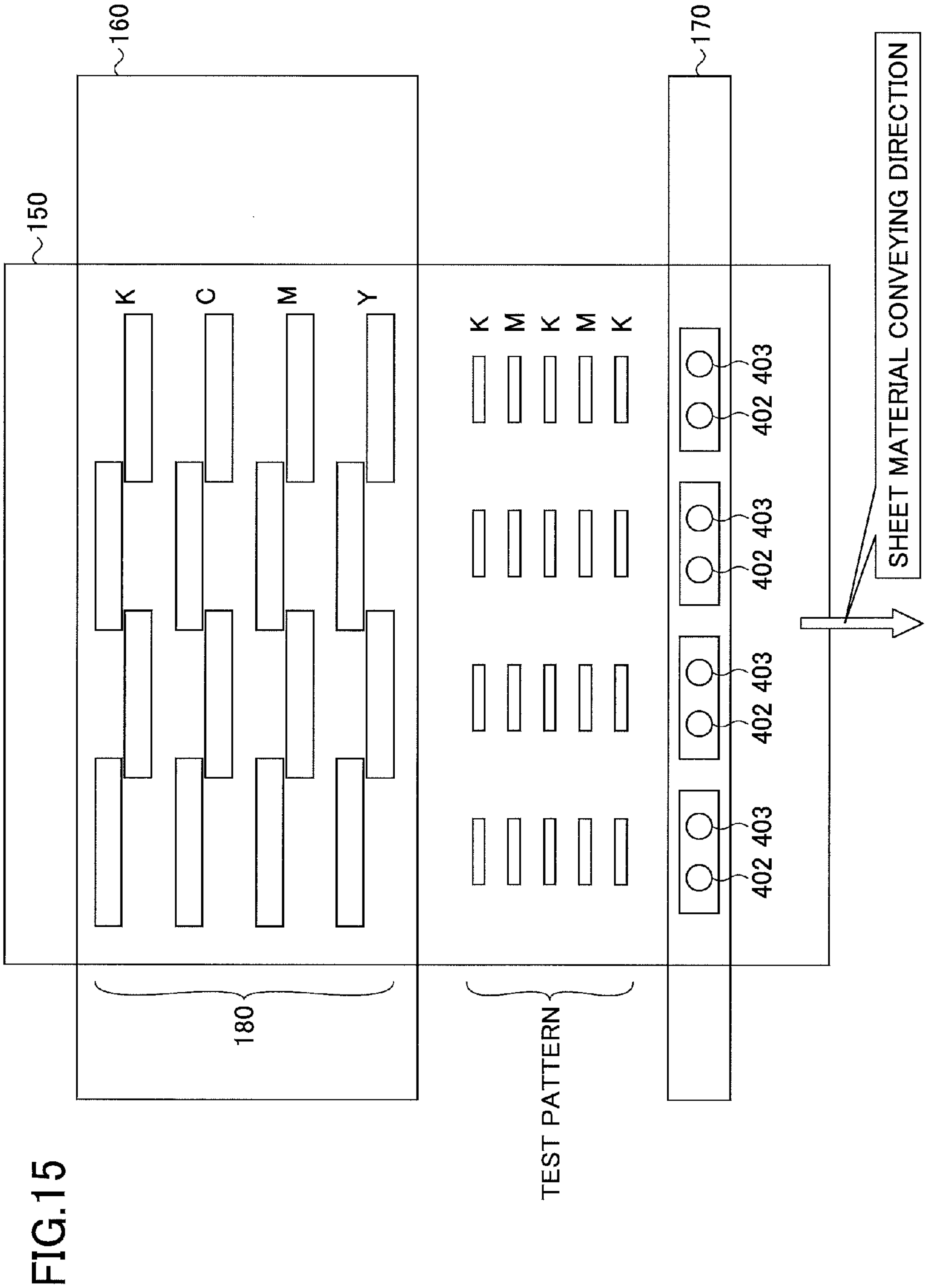
FIG. 15 is an exemplary diagram which schematically describes the test pattern and an arrangement of a head of a line-type image forming apparatus.

FIG. 15 is an exemplary diagram which schematically describes a test pattern and an arrangement of a head of the line-type image forming apparatus 100. A head fixing bracket 160 is fixed such that it is stretched from end to end in the main scanning directions orthogonal to a sheet material conveying direction. At the head fixing bracket 160 are arranged plural recording heads 180 of ink of KCMY from an upstream side to the whole area in the main scanning directions. The recording heads 180 of the four colors are arranged in a staggered fashion such that edges overlap. In this way, liquid droplets are ejected to obtain a sufficient resolution even at edges of the recording heads 180, making it possible to suppress an increase in cost without a need to arrange one recording head 180 in the whole area in the main scanning directions. One recording head 180 may be arranged in the whole area in the main scanning directions for each color, or an overlapped area in the main scanning directions of the recording head 180 of each color may be elongated.

Downstream of the head fixing bracket 160 is fixed a sensor fixing bracket 170 such that it is stretched from end to end in the main scanning directions orthogonal to the sheet material conveying direction. At the sensor fixing bracket 170, a number of print position offset sensors 30 are arranged, the number of the print position offset sensors 30 being equal to the number of heads. In other words, one print position offset sensor 30 is arranged such that a part overlaps one recording head 180 in the main scanning directions. Moreover, one print position offset sensor 30 includes a pair of the light emitting element 402 and the light receiving element 403. The light emitting element 402 and the light receiving element 403 are arranged such that they are nearly parallel to the main scanning direction.

In such an embodiment of the image forming apparatus 100, each line which makes up the test pattern is formed such that a longitudinal direction of the line is parallel to the main scanning direction. When an impacting position offset of a liquid droplet of a different color is corrected with K as a reference, the image forming apparatus 100 forms a K line and an M line, a K line and a C line, and a K line and a Y line. Then, as in the serial-type image forming apparatus 100, an edge position of the CMYK test pattern is detected, and a liquid droplet ejection timing is corrected from the position offset amount.

As described above, even in the line-type image forming apparatus 100, print position offset sensors 30 may be arranged properly to correct an impacting position offset.

(Operation Procedure)

Figure 16:
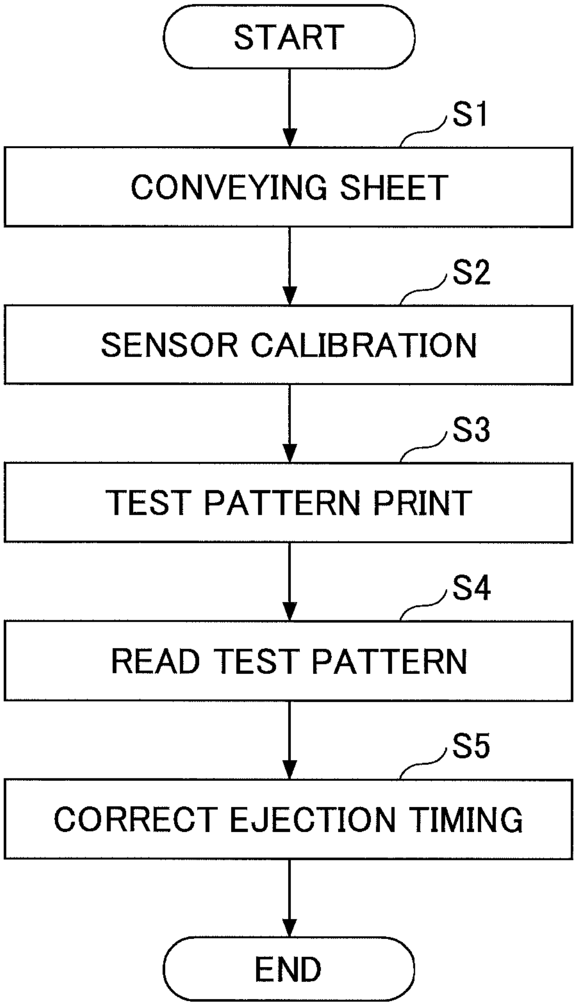
FIG. 16 is a flowchart which illustrates one example of a procedure in which a correction process executing unit performs a signal correction.

FIG. 16 is a flowchart which illustrates one example of a procedure in which the correction process executing unit 526 performs a signal correction.

First, the CPU 301 instructs the main controller 301 to start an impacting position offset correction. With this instruction, the main controller 310 drives the sub-scanning motor 132 via the sub-scanning drive unit 314 and conveys the sheet material 150 to right under the recording head 21 (S1).

Next, the main controller 310 drives the main scanning motor 27 via the main scanning drive unit 313 to move the carriage 5 over the sheet material 150 and carries out a calibration of a light emitting element and a light receiving element at a specific location on the sheet material 150 (S2).

Figure 17A:
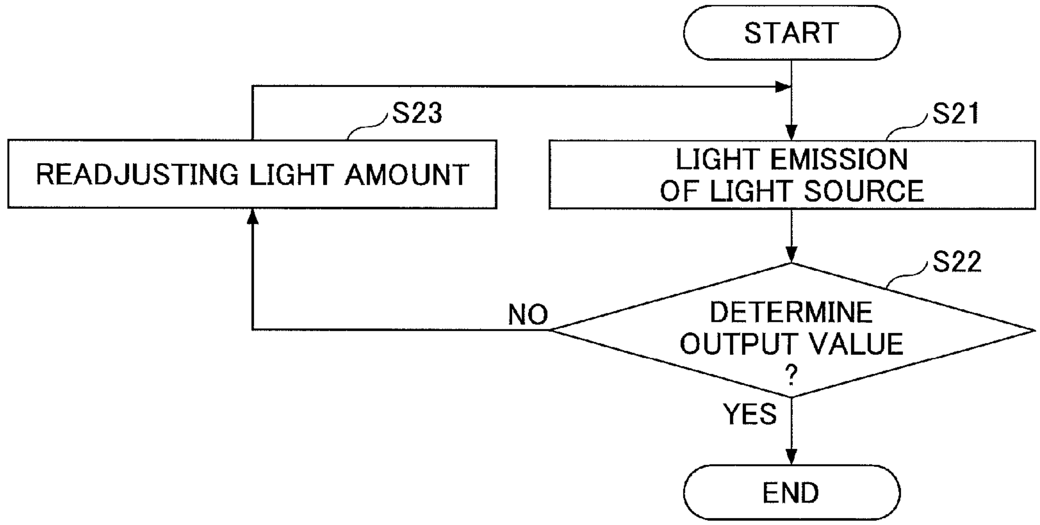
FIGS. 17A and 17B are exemplary flowcharts which illustrate details of a correction process.

FIG. 17A is an exemplary flowchart which explains a process in S2. A calibration is a process in which a light amount of the light emitting element is adjusted such that a detected voltage of the light emitting element falls within a desired range (more specifically, 4±0.2 V).

A PWM value for driving the light emitting element 402 of the print position offset sensor 30 is set in the light emission controller 511 by the CPU 301, and smoothing is performed at the smoothing circuit 512, after which it is provided to the driving circuit 513, which drives the light emitting element 402 to emit light (S21).

An intensity signal which is detected by the light receiving element 403 of the print position offset sensor 30 is stored in the shared memory 525 and the CPU 301 determines whether it takes a desired output value (voltage value) (S22).

If it takes the desired voltage value (Yes in S22), the process of FIG. 17A ends. If it does not take the desired voltage value (No in S22), the CPU 301 changes the PWM value (S23) to readjust the light amount.

Next, the main scanning controller 313 moves the carriage 5 via the main scanning drive motor 27, and the head drive controller 312 drives the recording heads 21-24 to print a test pattern for adjusting an impacting position offset (S3). Then, the main scanning controller 313 moves the carriage 5 via the main scanning drive motor 27, so that the print position offset sensor 30 reads the test pattern, and stores the detected voltage data in the shared memory 525 (S4).

Figure 17B:
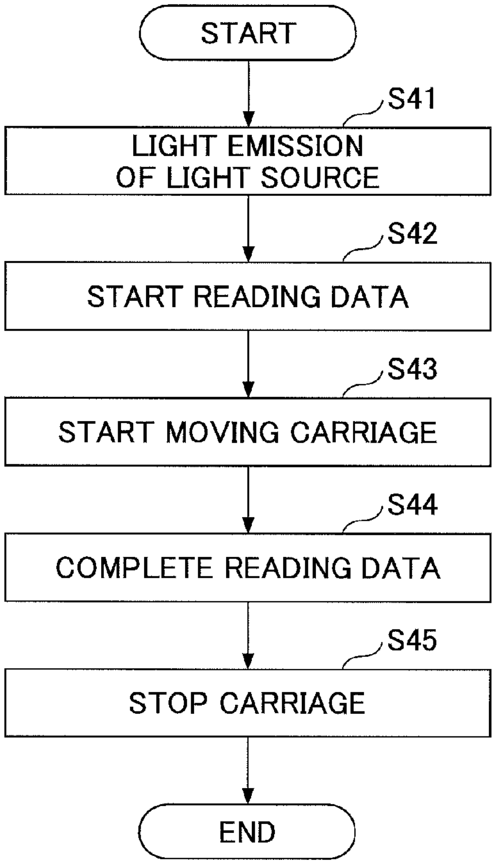

FIG. 17B is an exemplary flowchart which describes a process of S4. First, the CPU 301 turns on the light emitting element 402 (S41).

Next, the photoelectric conversion circuit 521, etc., starts taking in detected voltage data (S42). When the taking in is started, the main scanning drive unit 313 moves the carriage 5 with the main scanning drive motor 27. In other words, while moving the carriage 5, the photoelectric conversion circuit 521, etc., takes in the detected voltage data. The data are sampled at 20 kHz (50 μs intervals), for example.

When the carriage 5 reaches an end of the image forming apparatus 100, the photoelectric converting circuit 521, etc., completes taking in the detected voltage data (S44). The FPGA 306 accumulates a series of detected voltage data sets. The CPU 301 stops the carriage 5 at a home position.

Returning to FIG. 16, the correction process executing unit 526 uses the detected voltage to correct a liquid droplet ejection timing (S5). In other words, the threshold value determining unit 601 determines the lower-limit threshold value Vrd and the upper-limit threshold value Vru from the point of inflection, so that the ejection timing correction unit 603 determines the intersecting points C1 and c2 from the lower-limit threshold value Vrd and the upper-limit threshold value Vru. A half-way point of the intersecting points C1 and C2 is a position of a line which makes up a test pattern. The ejection timing correction unit 603 compares a distance of each line with an optimal distance to calculate an impacting position offset amount, and calculates a correction value of a liquid droplet ejection timing for driving the recording head 21 such that an impacting position offset is removed.

As described above, the image forming apparatus 100 according to the present embodiment may also specify an edge position using a lower-limit threshold value Vrd and an upper-limit threshold value Vru which are determined so as to include a point of inflection, making it possible to accurately correct an impacting position offset of liquid droplets.

Embodiment 2

In the present embodiment, a calculation of a correction value of a liquid droplet ejection timing is described for an image forming system embodied by a server, not an image forming apparatus.

Figure 18:
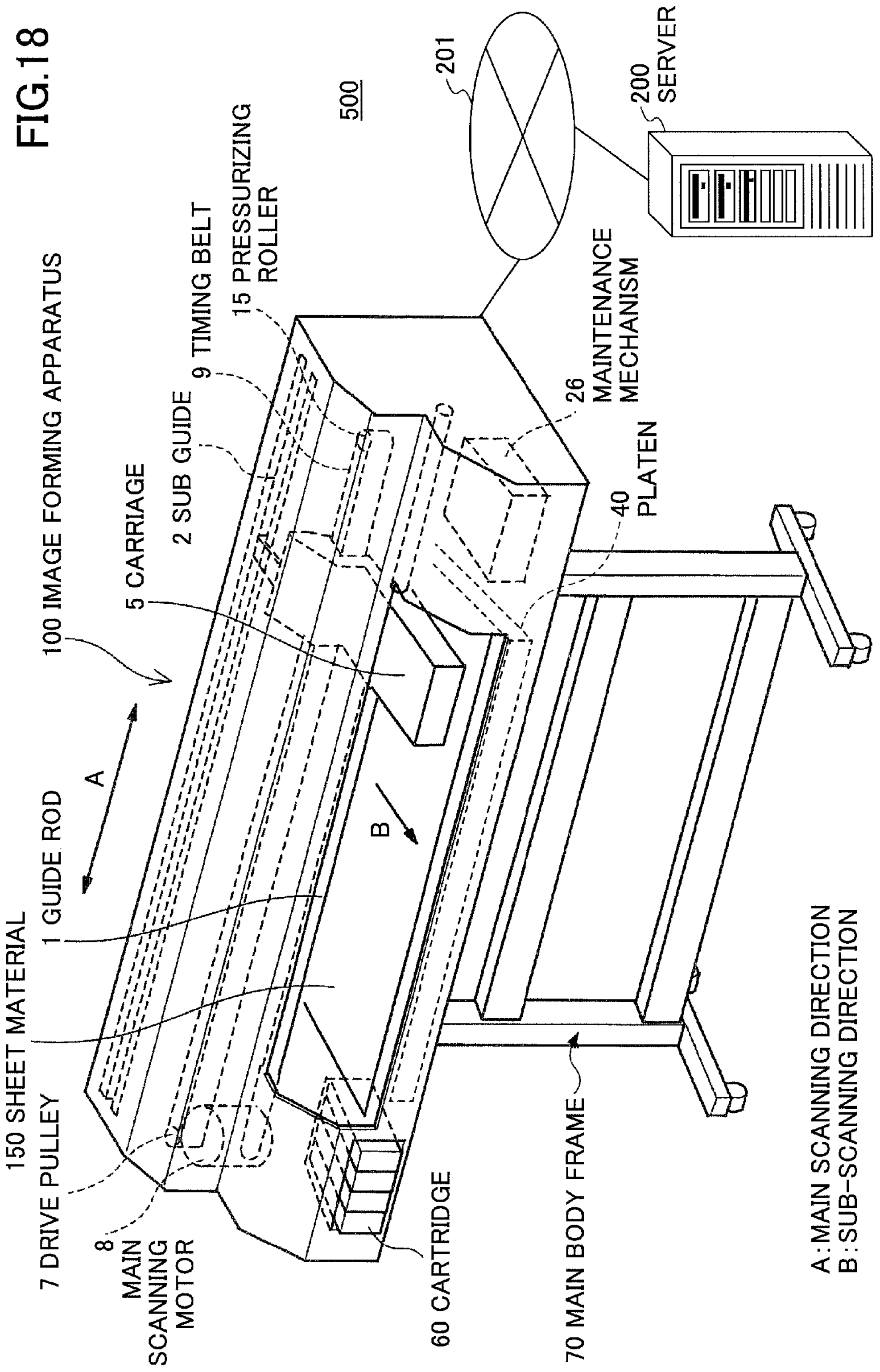
FIG. 18 is an exemplary diagram which schematically describes an image forming system which includes the image forming apparatus and a server.

FIG. 18 is an exemplary diagram which schematically describes an image forming system 500 which has an image forming apparatus 100 and a server 200. In FIG. 18, the same letters are given to the same elements as FIG. 3, so that a repeated explanation is omitted. The image forming apparatus 100 and the server 200 are connected via a network 201, which includes an in-house LAN; a WAN which connects to the LAN; or the Internet, or a combination thereof.

In the image forming system 500 as in FIG. 18, the image forming apparatus 100 forms a test pattern and scans the test pattern by a print position offset sensor, and the server 200 calculates the correction value of the liquid droplet ejection timing. Therefore, a processing burden of the image forming apparatus 100 may be reduced and functions of calculating a correction value of a liquid droplet ejection timing may be concentrated in the server.

Figure 19:
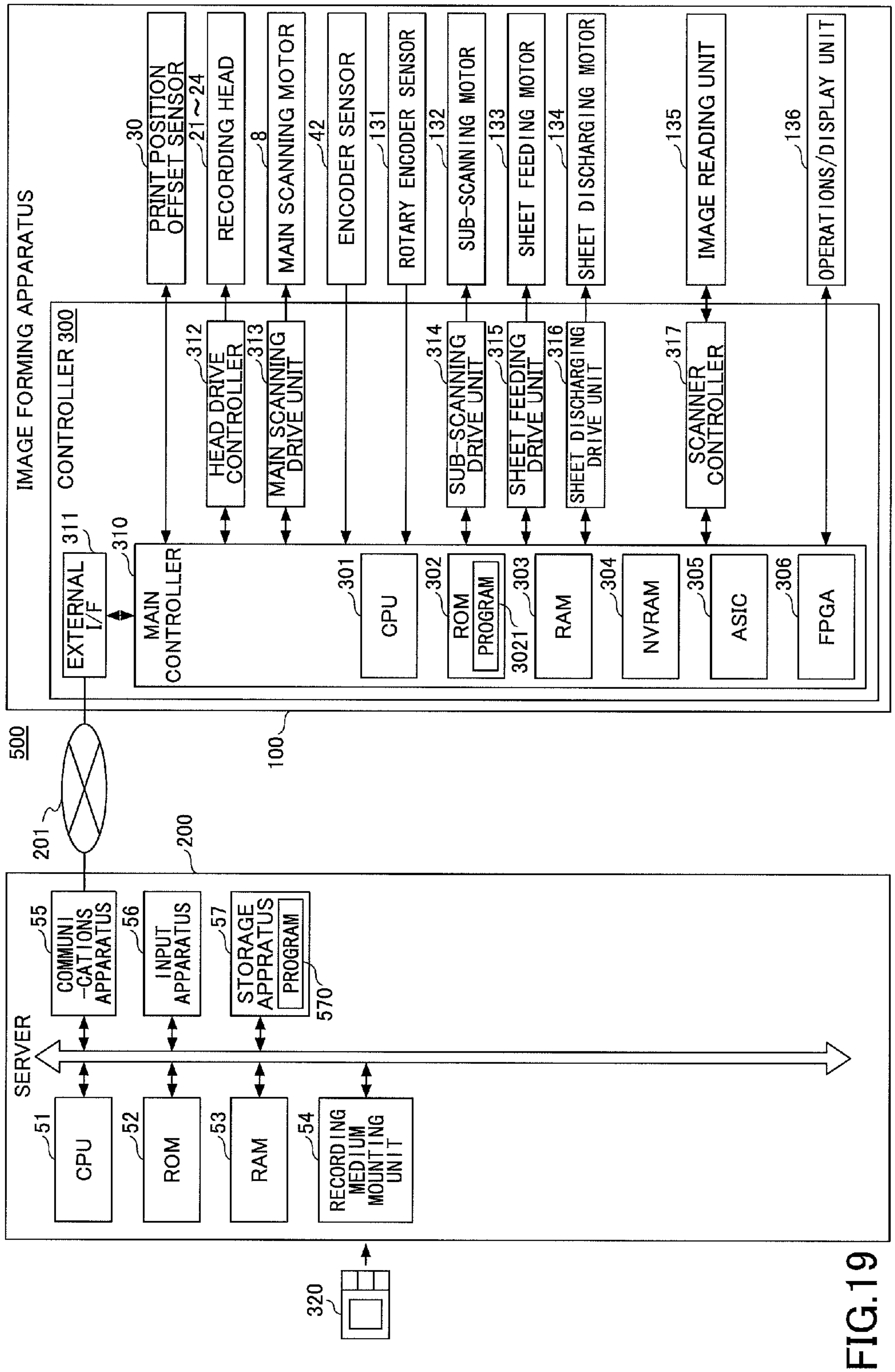
FIG. 19 is a diagram illustrating an example of a hardware configuration of the server and the image forming apparatus.

FIG. 19 is a diagram illustrating an example of a hardware configuration of the server 200 and the image forming apparatus 100. The server 200 includes a CPU 51, a ROM 52, a RAM 53, a recording medium mounting unit 54, a communications apparatus 55, an input apparatus 56, and a storage apparatus 57, which are connected by a bus. The CPU 51 reads an OS (Operating System) and a program 570 from the storage apparatus 57 to execute the program with the RAM 53 as a working memory. The program 570 performs a process of calculating a correction value of a liquid droplet ejection timing.

The RAM 53 becomes a working memory (a main storage memory) which temporarily stores necessary data, while a BIOS with initializing data, a bootstrap loader, etc., are stored in the ROM 52. The storage medium mounting unit 54 is an interface in which is mounted a portable storage medium 320.

The communications apparatus 55, which is called a LAN card or an Ethernet card, connects to the network 201 to communicate with an external I/F 311 of the image forming apparatus 100. A domain name or an IP address of the server 200 is registered.

The input apparatus 56 is a user interface which accepts various operating instructions of the user, such as a keyboard, mouse, etc. It may also be arranged for a touch panel or a voice input apparatus to be the input apparatus.

The storage apparatus 57 is a non-volatile memory such as a HDD (Hard Disk Drive), a flash memory, etc., storing an OS, a program, etc. The program 570 is distributed in a form recorded in the storage medium 320, or in a manner such that it is downloaded from the server 200 (not shown).

Figure 20:
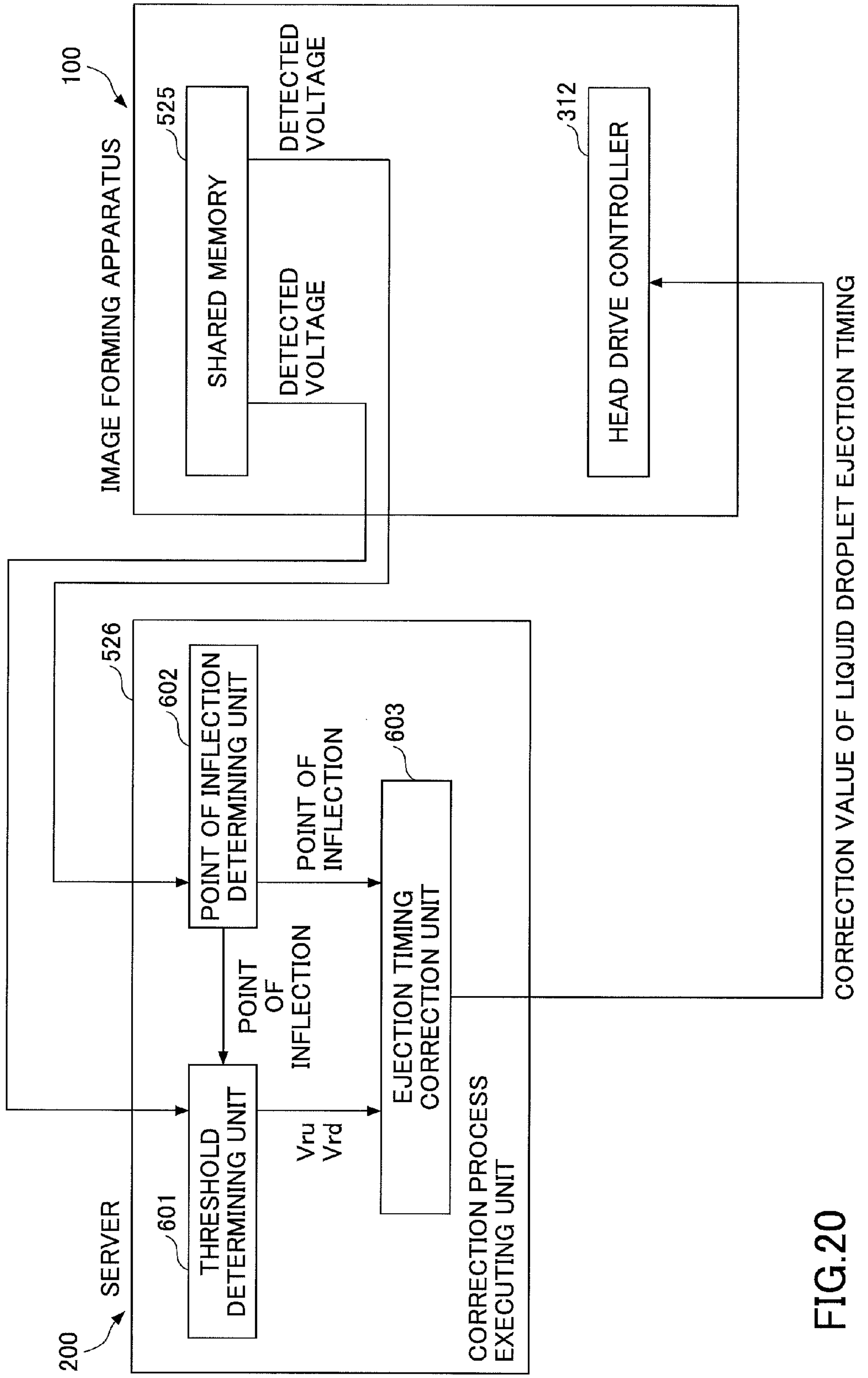
FIG. 20 is an exemplary functional block diagram of the image forming system.

FIG. 20 is an exemplary functional block diagram of the image forming system 500. Explanations of elements which are the same in FIG. 20 as in FIG. 7 are omitted. The image forming apparatus 100 of the present embodiment does not include the correction process execution unit 526, while the server side includes the correction process execution unit 526. Therefore, the image forming apparatus 100 is configured to include a shared memory 525 and a head drive unit 312.

The correction process execution unit 526 includes the threshold value determining unit 601, the point of inflection determining unit 602, and the ejection timing correction unit 603, whose functions are the same as in Embodiment 1.

For the image forming system 500, a correction value of the liquid droplet ejecting timing is calculated at the server, so that the image forming apparatus transmits the detected voltage data stored in the shared memory 525 to the server 200. As shown, it may appear that the same detected voltage data are transmitted twice, but it suffices to transmit the data once.

The correction process executing unit 526 at the server side determines a threshold value and a point of inflection to calculate a correction value of the liquid droplet ejection timing. The server 200 transmits the correction value of the liquid droplet ejection timing to the image forming apparatus 100, making it possible for the head drive controller 312 of the image forming apparatus 100 to change the ejection timing.

Figure 21:
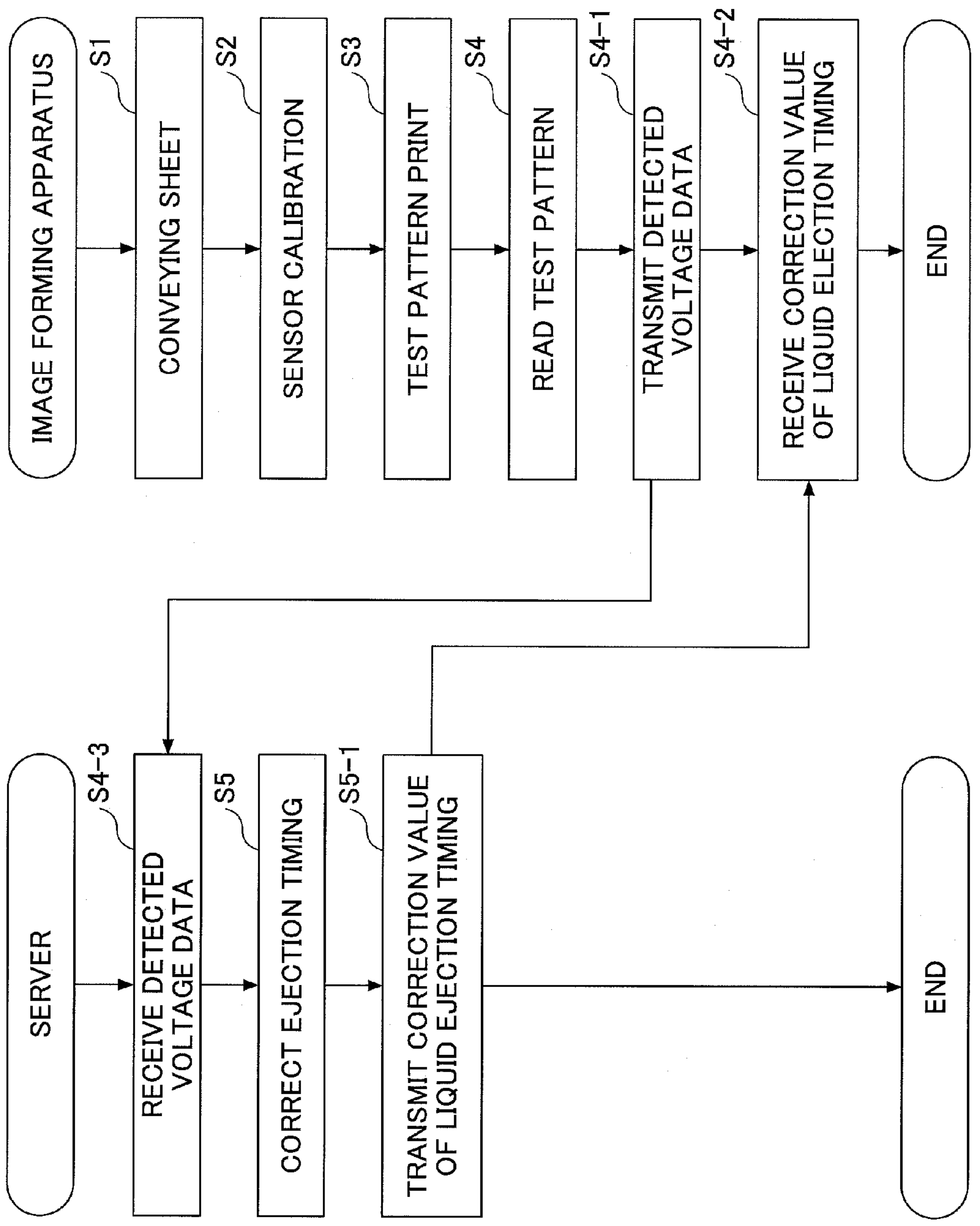
FIG. 21 is a flowchart which shows an operating procedure of the image forming system.

FIG. 21 is a flowchart which shows an operational procedure of the image forming system 500. As shown, only S5 in FIG. 21 is performed by the server 200, while the other processes S1-S4 are performed by the image forming apparatus 100.

Moreover, the image forming apparatus 100 and the server 200 communicate, so that the image forming apparatus 100 newly performs a process which transmits detected voltage data in Step S4-1 and a process which receives a correction value of the liquid droplet ejection timing in Step S4-2.

In the meantime, the server 200 newly performs a process which receives the detected voltage data in S4-3 and a process which transmits a correction value of the liquid droplet ejecting timing to the image apparatus 100 in S5-1.

In this way, with only a change in where the process is performed, the image forming system 500 may suppress an impact received from a characteristic of a sheet material as in Embodiment 1, to accurately correct the liquid droplet ejection timing.

The present application is based on Japanese Priority Applications No. 2011-038742 filed on Feb. 24, 2011, and No. 2011-276399 filed on Dec. 16, 2011, the entire contents of which are hereby incorporated by reference.

The invention claimed is:

1. An image forming apparatus which reads a test pattern formed by ejecting liquid droplets onto a recording medium to adjust an ejection timing of the liquid droplets, comprising:

an image forming unit configured to obtain pattern data of the test pattern to form the test pattern on the recording medium;

a reading unit including a light emitting unit configured to irradiate a light onto the recording medium and a light receiving unit configured to receive a reflected light from the recording medium;

a relative movement unit configured to move the recording medium or the receiving unit at a constant speed;

an intensity data obtaining unit configured to obtain intensity data on the reflected light which is received from a scanning position of the light by the light receiving unit while the light moves over the test pattern;

a threshold value setting unit configured to set an upper-limit threshold value and a lower-limit threshold value to respective two points having a same distance from a derivative point, the derivative point being a point in a derivative of the intensity data whose slope is closest to zero; and a determination unit configured to determine an edge position based on a first-main-scanning position where the intensity data corresponds to the upper-limit threshold value and a second main-scanning position where the intensity data corresponds to the lower-limit threshold value.

2. The image forming apparatus as claimed in claim 1, wherein a position detection unit applies a line position determining operation on the intensity data between the upper-limit threshold value and the lower-limit threshold value to detect the position of the line.

3. The image forming apparatus as claimed in claim 1, further comprising, a point of inflection calculation unit configured to extract a predetermined number of data sets in upward and downward directions of a center detected value of the intensity data, and determine the center detected value with a smallest difference of segments of a regression line of the data sets on the upper side and on the lower side as the point of inflection.

4. The image forming apparatus as claimed in claim 1, further comprising, a point of inflection calculation unit configured to extract a predetermined number of data sets in upward and downward directions of a center detected value of the intensity data, wherein the respective data sets on the upper side or on the lower side are rotated by 180 degrees around the center detected value, wherein indices of the regression line of the data on the upper side and of the regression line of the data on the lower side are calculated, and wherein center detected value for which the indices have the closest match is determined as the point of inflection.

5. The image forming apparatus as claimed in claim 1, wherein the relative movement unit is further configured to move the reading unit in a main scanning direction relative to the recording medium to cause the light to cross multiple of the line.

6. The image forming apparatus as claimed in claim 1, wherein the relative movement unit is further configured to move the recording medium in a sub-scanning direction relative to the reading unit to cause the light to cross multiple of the lines.

7. A method of detecting a pattern position of an image forming apparatus, the image forming apparatus reading a test pattern formed by ejecting liquid droplets onto a recording medium to adjust an ejection timing of the liquid droplets, the method comprising the steps of:

relatively moving, by a relative movement unit, the recording medium or a light emitting unit and a light receiving unit at a constant speed, the light emitting unit to irradiate a light onto the recording medium and the light receiving unit to receive a reflected light from the recording medium;

obtaining, by an intensity data obtaining unit, intensity data of the reflected light which is received from a scanning position of the light by the light receiving unit while the light crosses the test pattern;

setting, by a threshold value setting unit, an upper-limit threshold value and a lower-limit threshold value to respective two points having a same distance from a derivative point, the derivative point being a point in a derivative of the intensity data whose slope is closest to zero; and determining, by a determination unit, an edge position based on a first-main-scanning position where the intensity data corresponds to the upper-limit threshold value and a second main-scanning position where the intensity data corresponds to the lower-limit threshold value.

8. An image forming system which reads a test pattern formed by ejecting liquid droplets onto a recording medium to adjust an ejection timing of the liquid droplets, comprising:

an image forming apparatus including, an image forming unit for obtaining pattern data of the test pattern to form the test pattern onto the recording medium;

a reading unit including a light emitting unit for irradiating a light onto the recording medium and a light receiving unit which receives a reflected light from the recording medium;

a relative movement unit for moving the recording medium or the reading unit at a constant speed; and an intensity data obtaining unit for obtaining intensity data of the reflected light received from a scanning position of the light by the light receiving unit while the light moves over the test pattern;

a pattern data storage unit for storing the pattern data of the test pattern;

a threshold value setting unit configured to set an upper-limit threshold value and a lower-limit threshold value to respective two points having a same distance from a derivative point, the derivative point being a point in a derivative of the intensity data whose slope is closest to zero; and a determination unit configured to determine an edge position based on a first-main-scanning position where the intensity data corresponds to the upper-limit threshold value and a second main-scanning position where the intensity data corresponds to the lower-limit threshold value.

* * * * *